United States Patent
Sun et al.

(10) Patent No.: US 10,098,083 B2
(45) Date of Patent: Oct. 9, 2018

(54) CLOCK DRIFT MANAGEMENT FOR COEXISTENCE AND CONCURRENCY

(71) Applicant: QUALCOMM Incorporated, San Diego, CA (US)

(72) Inventors: Yanjun Sun, San Diego, CA (US); Rahul Malik, San Diego, CA (US); Peerapol Tinnakornsrisuphap, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 67 days.

(21) Appl. No.: 14/678,620

(22) Filed: Apr. 3, 2015

(65) Prior Publication Data
US 2016/0295538 A1 Oct. 6, 2016

(51) Int. Cl.
| | |
|---|---|
| *H04W 4/00* | (2018.01) |
| *H04W 56/00* | (2009.01) |
| *H04W 72/12* | (2009.01) |
| *H04L 1/00* | (2006.01) |
| *H04L 1/18* | (2006.01) |

(Continued)

(52) U.S. Cl.
CPC .......... *H04W 56/0045* (2013.01); *H04L 1/00* (2013.01); *H04L 1/1854* (2013.01); *H04W 56/003* (2013.01); *H04W 72/1231* (2013.01); *H04W 72/12* (2013.01); *H04W 84/12* (2013.01); *H04W 88/06* (2013.01)

(58) Field of Classification Search
CPC ......... H04W 56/0045; H04W 72/1231; H04W 84/12; H04W 88/06
See application file for complete search history.

(56) References Cited

U.S. PATENT DOCUMENTS

2003/0147368 A1* 8/2003 Eitan ................. H04W 72/1215
370/338
2004/0203474 A1 10/2004 Miller et al.
(Continued)

FOREIGN PATENT DOCUMENTS

| EP | 1566907 A1 | 8/2005 |
|---|---|---|
| WO | WO-2012019321 A1 | 2/2012 |

OTHER PUBLICATIONS

ISA/EPO, International Search Report and Written Opinion of the International Searching Authority, Int'l App. No. PCT/US2016/021258, dated Jun. 15, 2016, European Patent Office, Rijswijk, NL, 11 pgs.

*Primary Examiner* — Abdelnabi O Musa
(74) *Attorney, Agent, or Firm* — Holland & Hart LLP

(57) ABSTRACT

Methods, systems, and devices are described for dealing with mutual clock drifts for communications over multiple RATs by maintaining a guard interval. A guard interval is a time interval during which no transmissions should occur. For example, the guard interval may be set relative to a scheduled interference interval of a STA so that transmissions to the STA from an AP will not collide with different RAT (e.g., interference) transmissions/receptions even with clock drift (e.g., a guard interval at both sides of the scheduled interference interval). Such an approach may allow the clocks to be re-synchronized (e.g., by the STA notifying the AP of the schedule of interference interval) infrequently to avoid excessive signaling overhead, which would increase with an increase in the number of coexistence STAs being serviced by the AP.

30 Claims, 16 Drawing Sheets

(51) Int. Cl.
*H04W 84/12* (2009.01)
*H04W 88/06* (2009.01)

(56) References Cited

U.S. PATENT DOCUMENTS

| | | | |
|---|---|---|---|
| 2011/0222524 A1* | 9/2011 | Thomson | H04H 40/18 370/339 |
| 2012/0257521 A1* | 10/2012 | Mehta | H04W 72/1215 370/252 |
| 2013/0083789 A1* | 4/2013 | Ho | H04W 56/0015 370/350 |
| 2014/0071921 A1 | 3/2014 | Wang et al. | |
| 2014/0211766 A1* | 7/2014 | Zhao | H04W 72/1215 370/336 |
| 2014/0348047 A1 | 11/2014 | Park et al. | |
| 2014/0355621 A1 | 12/2014 | Katar et al. | |

\* cited by examiner

CLOCK DRIFT MANAGEMENT FOR COEXISTENCE AND CONCURRENCY

BACKGROUND

Field of the Disclosure

The present disclosure, for example, relates to wireless communication systems, and more particularly to techniques for managing clock drift when communications involve multiple active coexisting radio access technologies.

Description of Related Art

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power).

A wireless communications network may include a number of network devices, e.g., an access point (AP), that can support communication for a number of wireless communication devices. A wireless device may communicate with a network device bi-directionally. For example, in a wireless local area network (WLAN), such as a Wi-Fi network (IEEE 802.11), a station (STA) may communicate with an associated AP via downlink and uplink channels. From the perspective of a STA, the downlink channel (or forward link) refers to the communication link from the AP to the station, and the uplink channel (or reverse link) refers to the communication link from the station to the AP. The AP may be coupled to a network, such as the Internet, and enable a STA (e.g., mobile device) to communicate via the network (and/or communicate with other devices coupled to the access point).

In some cases, a wireless communication device may have multiple coexisting radios for different radio access technologies (RATs). For example, a wireless communication device may use one radio to send and receive WLAN communications and another radio to send and receive Bluetooth (BT) communications. The device may manage its communications over the different RATs, for example, so that WLAN communications are not attempted while BT communications are active. Thus, there may be a scheduled interference interval (e.g., for BT) for a STA during which an AP should not attempt WLAN communications with the STA.

Each radio (the coexisting radios of the STA (e.g., WLAN and Long Term Evolution (LTE) or BT) and the radio of the AP (WLAN)) has its own clock for the timing of transmissions and receptions. Clock drift between these different clocks may lead to an inaccurate estimation by the AP of the actual schedule of the interference interval at the STA. This may result in collisions of AP transmissions to the STA with transmissions/receptions at the STA over the different RAT or to underutilized medium time.

SUMMARY

The techniques described herein relate to mutual clock drifts for communications over multiple RATs by maintaining a guard interval. A guard interval is a time interval during which no transmissions should occur. For example, the guard interval may be set relative to a scheduled interference interval of a STA so that transmissions to the STA from an AP will not collide with different RAT (e.g., interference) transmissions/receptions even with clock drift (e.g., a guard interval at both sides of the scheduled interference interval). Such an approach may allow the clocks to be re-synchronized (e.g., by the STA notifying the AP of the schedule of interference interval) infrequently to avoid excessive signaling overhead, which would increase with an increase in the number of coexistence STAs being serviced by the AP.

A method for wireless communication is described. The method may involve identifying a guard interval for a first wireless communication device (WCD) having coexisting radios that use different radio access technologies (RATs). The identified guard interval may be applied before and after a start of a scheduled interference interval for the first WCD. The guard interval may define a non-transmission time interval to the first WCD.

The guard interval may indicate to the first WCD not to send a trigger during the non-transmission time interval to a second WCD for a transmission from the second WCD. Alternatively or additionally, the guard interval may indicate to a second WCD not to send a transmission to the first WCD in response to a trigger received from the first WCD during the non-transmission time interval.

The method also may involve sending a transmission from a second WCD based at least in part on the scheduled interference interval for the first WCD and the applied guard interval.

The scheduled interference interval may be for a first RAT. In such case, sending the transmission from the second WCD may be via a second RAT that is different from the first RAT.

The second WCD may be a wireless local area network (WLAN) access point (AP). In such case, the guard interval may be announced using at least one of a beacon from the AP, or a probe response from the AP, or a combination thereof.

Identifying the guard interval for the first WCD may involve identifying a default guard interval at the second WCD that is capable of being overridden by a local guard interval identified at the first WCD.

Identifying the guard interval for the first WCD may be based at least in part on standards for clock drifts for the different RATs.

Identifying the guard interval for the first WCD may involve identifying a local guard interval specific to the first WCD. In such case, identifying the local guard interval may be based at least in part on a clock drift for a local clock of the first WCD. The method also may involve overriding a default guard interval with the identified local guard interval.

Identifying the guard interval for the first WCD may involve identifying a common guard interval for a plurality of WCDs of a network that includes the first WCD. For example, the second WCD may be a wireless local area network (WLAN) access point (AP). In such case, identifying the guard interval for the first WCD may involve identifying the guard interval common to WCDs of the WLAN AP including the first WCD.

The method also may involve monitoring mutual clock drift between the first WCD and a second WCD. A communication may be sent based at least in part on the mutual clock drift and the guard interval. The communication may include an update to an interference schedule for the first WCD. The communication may be sent from the first WCD to the second WCD.

The method also may involve determining a clock drift value based at least in part on the mutual clock drift. The clock drift value may be compared to the guard interval, and sending the communication may be performed when the clock drift value is within a threshold value of the guard interval.

An apparatus for wireless communication also is described. The apparatus may include: means for identifying a guard interval for a first wireless communication device (WCD) having coexisting radios that use different radio access technologies (RATs); and, means for applying the identified guard interval before and after a start of a scheduled interference interval for the first WCD. The guard interval may define a non-transmission time interval to the first WCD. The apparatus may include these and other features to carry out the functions described above and further herein.

Another apparatus for wireless communication is described. The apparatus may include: a guard interval determiner to identify a guard interval for a first wireless communication device (WCD) having coexisting radios that use different radio access technologies (RATs); and, a communications manager to apply the identified guard interval before and after a start of a scheduled interference interval for the first WCD. The guard interval may define a non-transmission time interval to the first WCD. The apparatus may include these and other features to carry out the functions described above and further herein.

A non-transitory computer-readable medium is described. The medium may store computer-executable code for wireless communication. The code may be executable by a processor to: identify a guard interval for a first wireless communication device (WCD) having coexisting radios that use different radio access technologies (RATs); and, apply the identified guard interval before and after a start of a scheduled interference interval for the first WCD. The guard interval may define a non-transmission time interval to the first WCD.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The described features generally relate to systems, methods, and/or apparatuses for wireless communications. As described above, a wireless communication device may have multiple coexisting radios for different radio access technologies (RATs). For example, a wireless communication device may use one radio to send and receive WLAN communications and another radio to send and receive Bluetooth (BT) communications. Further, the device may use scheduling to help avoid conflicts (e.g., collisions) between communications using the different RATs. For example, the wireless communication device having coexisting radios may determine at least one scheduled interference interval during which the device may transmit/receive communications via one of the different RATs (e.g., LTE, BT or other non-WLAN). An AP may use knowledge of the scheduled interference interval(s) to adjust the size and timing of its transmissions to "fit" within non-interference time windows of the STA, thus avoiding the known interference.

However, because of mutual clock drift between the clocks for the different RATs (e.g., the clock of the STA for BT and the timing synchronization function (TSF) clock of the AP), the AP may determine an inaccurate estimation of the actual scheduled interference interval(s) over time. This may lead to collisions of the AP transmissions (WLAN/Wi-Fi) to the STA with communications via the different RAT. In addition, this may lead to underutilized medium time.

Approaches described herein use a guard interval to address the mutual clock drift. The guard interval for a STA may be a time interval during which the AP should not transmit to the STA, and may be set relative to the scheduled interference interval(s) of the STA. Further, the mutual clock drift may be monitored so that the clocks for the different RATs may be re-synchronized as the mutual clock drift approaches the guard interval (e.g., attains a value that is within a threshold of the guard interval).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Figure 1:
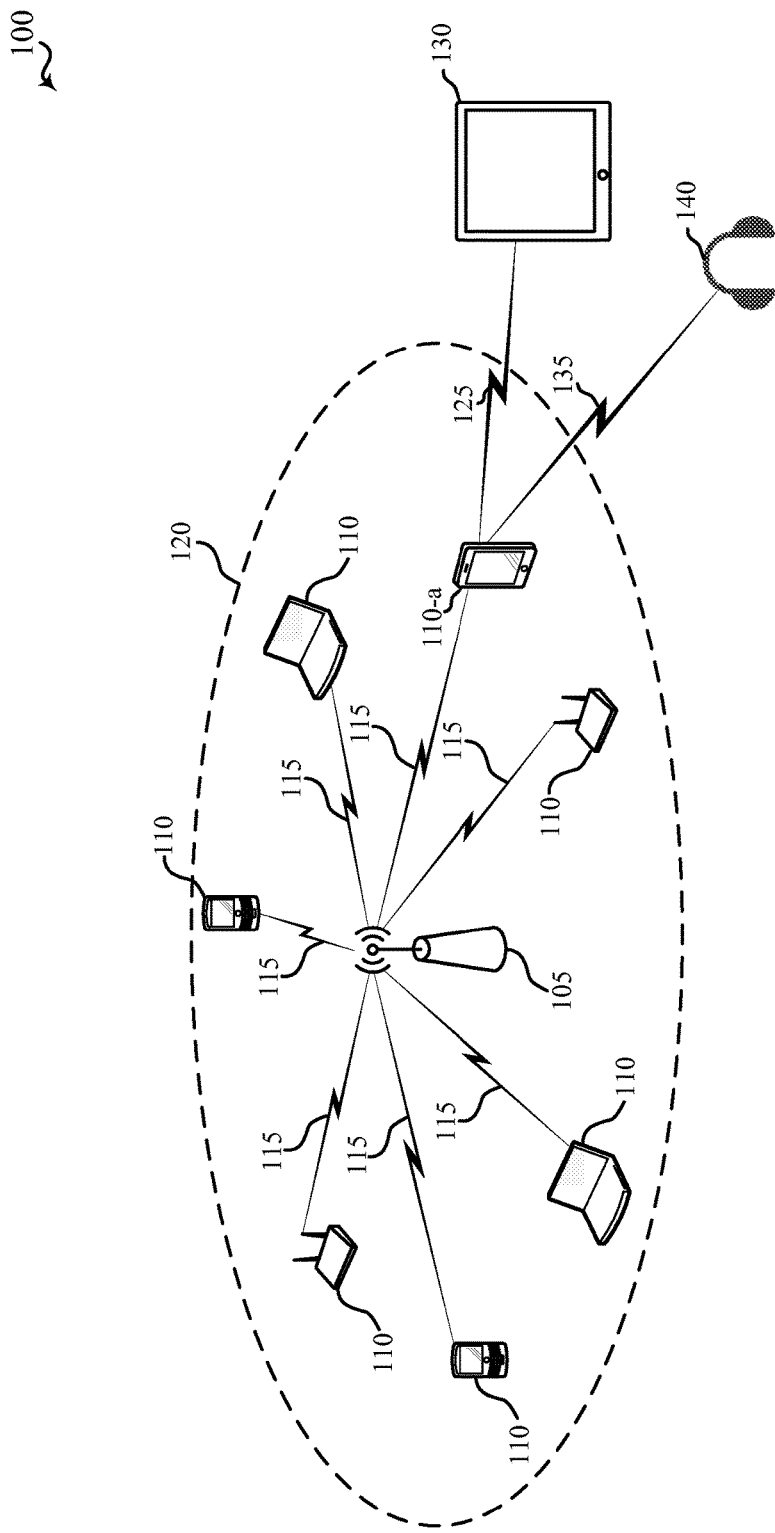
FIG. 1 shows a block diagram of a wireless communication system, in accordance with various aspects of the present disclosure.

Referring first to FIG. 1, a block diagram illustrates an example of a WLAN network 100 such as, e.g., a network implementing at least one of the IEEE 802.11 family of standards (also known as a Wi-Fi network). The WLAN network 100 includes an access point (AP) 105 and multiple associated stations (STAs) 110, such as mobile stations, personal digital assistants (PDAs), other handheld devices, netbooks, notebook computers, tablet computers, laptops, display devices (e.g., TVs, computer monitors, etc.), printers, etc. In this example, there are shown seven (7) STAs 110; however, the WLAN network 100 may have more or fewer STAs 110 than those shown in FIG. 1 since the number shown is simply for illustrative purposes. Also, while only one AP 105 is illustrated, the WLAN network 100 may have multiple APs 105.

Each of the wireless stations 110, which may also be referred to as mobile stations (MSs), mobile devices, access terminals (ATs), user equipment (UE), subscriber stations (SSs), or subscriber units, may associate and communicate with the AP 105 via a WLAN communication link 115. The AP 105 may communicate bi-directionally with each of the STAs 110 using WLAN communication links 115. The WLAN communication links 115 may include downlink transmissions (e.g., beacon frames) that are sent from the AP 105 to a STA 110, as well as uplink transmissions (e.g., acknowledgement (ACK) frames) that are sent from a STA 110 to the AP 105.

The AP 105 and the associated STAs 110 may represent a basic service set (BSS) or an extended service set (ESS). The various STAs 110 in the network may be able to communicate with one another through the AP 105. Also shown is a geographical coverage area 120 of the AP 105, which may represent a basic service area (BSA) of the WLAN network 100. Although not shown in FIG. 1, an extended network base station associated with the WLAN network 100 is typically connected to a wired or wireless distribution system (DS) that may allow multiple APs 105 to be connected in an ESS.

Although not shown in FIG. 1, a wireless station 110 can be covered by more than one AP 105 and can therefore associate with multiple APs 105 at different times. The coverage area 120 for the access point 105 may be divided into sectors making up only a portion of the coverage area (not shown). The WLAN network 100 may include access points 105 of different types (e.g., metropolitan area, home network, etc.), with varying sizes of coverage areas and overlapping coverage areas for different technologies. Although not shown, other wireless devices can communicate with the AP 105.

While the wireless stations 110 may communicate with each other through the AP 105 using WLAN communication links 115, each wireless station 110 may also communicate directly with other wireless stations 110 via a direct wireless link (not shown). Wireless stations 110 may communicate via a direct wireless link when such wireless stations 110 are in the AP coverage area 120 or when a wireless station 110 is outside the AP coverage area 120. Examples of direct wireless links may include Wi-Fi Direct connections, connections established by using a Wi-Fi Tunneled Direct Link Setup (TDLS) link, and other P2P group connections. The wireless stations 110 in these examples may communicate according to the WLAN radio and baseband protocol including physical and MAC layers from IEEE 802.11, and its various versions including, but not limited to, 802.11b, 802.11g, 802.11a, 802.11n, 802.11 ac, 802.11 ad, 802.11 ah, etc. In other implementations, other peer-to-peer connections and/or ad hoc networks may be implemented within WLAN network 100.

A STA 110-a, for example, may have coexisting radios for different RATs. As such, the STA 110-a also may communicate over a non-WLAN communication link 125 with a peripheral device 130 (e.g., a tablet) outside of the WLAN network 100 using a non-WLAN radio, such as a cellular radio (e.g., long term evolution (LTE)). Alternatively or additionally, the STA 110-a may communicate over a non-WLAN communication link 135 with another peripheral device 140 (e.g., a wireless headset) outside of the WLAN network 100 using a different non-WLAN radio, such as a BT radio. Although not shown for the sake of simplicity, one of the peripheral devices 130, 140 may be another STA 110 with which the STA 110-a communicates over a non-WLAN connection instead of through the WLAN network 100.

As discussed above, communications using the different RATs may be coordinated to help avoid collisions and/or to efficiently use medium time. For example, the STA 110-a may determine a scheduled interference interval during which the STA 110-a may transmit/receive communications via one of the different RATs (e.g., LTE, BT or other non-WLAN).

Figure 2A:
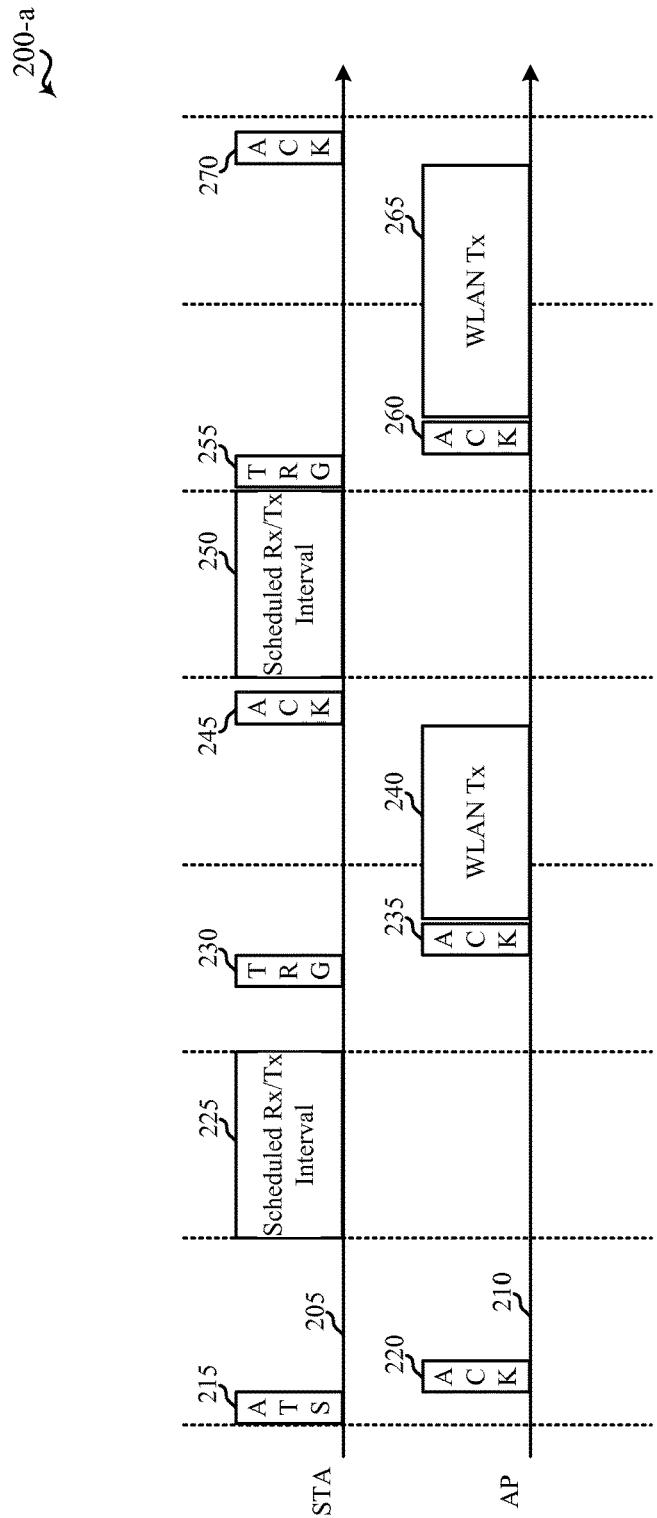
FIG. 2A shows a timing diagram for communications with a device having coexisting radios for different RATs, in accordance with various aspects of the present disclosure.

Turning now to FIG. 2A, a timing diagram 200-a is shown for communications with a STA having coexisting radios for different RATs, in accordance with various aspects of the present disclosure. A timeline 205 is shown for the STA and a timeline 210 is shown for the AP. The STA may send an add traffic stream (ATS or ADDTS) message or frame 215 to the AP that informs the AP of a scheduled interference (e.g., reception/transmission or Rx/Tx) interval for communications via a non-WLAN RAT (e.g., LTE or BT). In response, the AP may send an acknowledgement (ACK) frame 220.

In this example, the STA may determine a first scheduled Rx/Tx interval 225 and a second scheduled Rx/Tx interval 250. Although not shown, additional scheduled Rx/Tx intervals may be determined as well. In some cases, such intervals may be equal in length and periodic such that the STA may inform the AP of the start of the first interval, the length of the interval and the periodicity of the intervals.

The AP should avoid transmitting to the STA during any scheduled Rx/Tx interval. Thus, no transmissions from the AP to the STA are shown during the first scheduled Rx/Tx interval 225. After an end of the first scheduled Rx/Tx interval 225, the STA may send a trigger (TRG) frame 230 to the AP that indicates that the STA is ready to receive a transmission from the AP. In response, the AP may transmit an ACK frame 235 and then may transmit data to the STA via at least one WLAN transmission (Tx) 240. With knowledge of the second scheduled Rx/Tx interval 250, the AP may adjust the length/timing of the WLAN Tx 240 to end with enough time for the STA to send an ACK frame 245 after receiving the WLAN Tx 240 and before a start of the second scheduled Rx/Tx interval 250.

After an end of the second scheduled Rx/Tx interval 250, the STA may send another TRG frame 255 to the AP to indicate that the STA is ready to receive further transmission(s) from the AP. In response, the AP may transmit an ACK frame 260 and then may transmit data to the STA via at least one WLAN Tx 265. Again, the AP may adjust the length/timing of the WLAN Tx 265 to end with enough time for the STA to send an ACK frame 270 after receiving the WLAN Tx 240 and before a start of a next scheduled Rx/Tx interval (not shown). Concurrent communications via the coexisting RATs at the STA may be performed in such a manner to help avoid collisions between such communications.

Figure 2B:
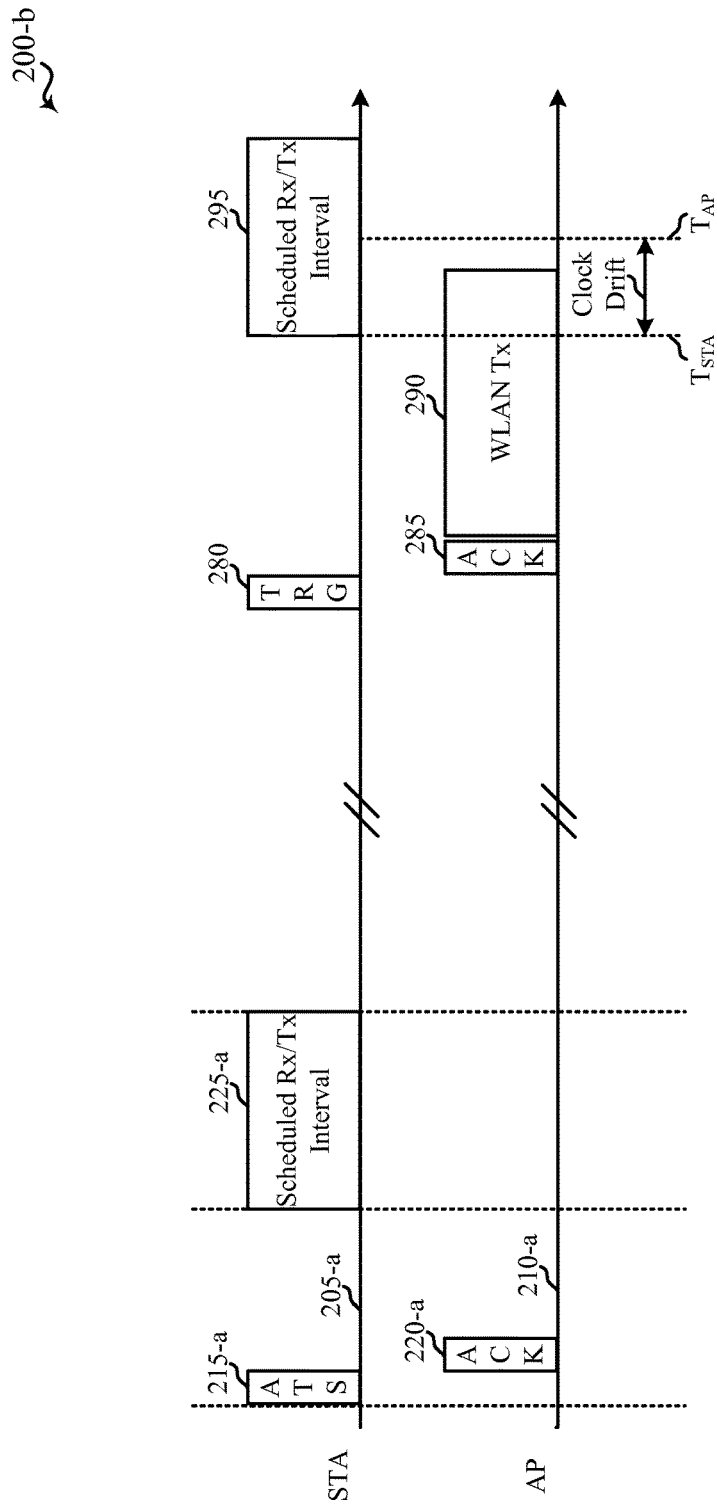
FIG. 2B shows a timing diagram illustrating a situation that may occur when the AP clock for WLAN communications is slower than the STA clock for communications via a different RAT.

FIG. 2B shows a timing diagram 200-b illustrating a situation that may occur when the AP clock for WLAN communications is slower than the STA clock for communications via the different RAT (e.g., LTE or BT). Similar to FIG. 2A, a timeline 205-a is shown for the STA and a timeline 210-a is shown for the AP. The STA may send an ATS frame 215-a to the AP to inform the AP of scheduled interference (e.g., Rx/Tx) intervals for communications via the different RAT. In response, the AP may send an acknowledgement (ACK) frame 220-a. As described above with respect to FIG. 2A, the AP should avoid transmitting to the STA during any scheduled Rx/Tx interval. Thus, no transmissions from the AP to the STA are shown during a first scheduled Rx/Tx interval 225-a.

A break in the timelines 205-a and 210-a illustrates an elapse of time sufficient for mutual clock drift between the STA's clock for the different RAT and the AP's TSF clock to adversely affect communications. After such an elapse of time, the STA may send a TRG frame 280 to the AP to indicate that the STA is ready to receive a transmission from the AP. In response, the AP may transmit an ACK frame 285 and then may transmit data to the STA via at least one WLAN Tx 290. With knowledge of a subsequent scheduled Rx/Tx interval 295, the AP may adjust the length/timing of the WLAN Tx 290. However, the AP may inaccurately estimate a beginning of the scheduled Rx/Tx interval 295 to occur at a time $T_{AP}$ when the scheduled Rx/Tx interval 295 actually begins at a time $T_{STA}$ according to the STA's clock for the different RAT. Such inaccuracy may result from the mutual clock drift, represented by the difference between $T_{STA}$ and $T_{AP}$ shown in FIG. 2B.

In such case, the mutual clock drift may result in a portion (e.g., subframes) of the WLAN Tx 290 colliding with communications via the different RAT occurring during the scheduled Rx/Tx interval 295 (illustrated by the overlap in time). As such, the overlapping portion of the WLAN Tx 290 may not be successfully received by the STA. Although the portion may be retransmitted later on, such retransmission involves using additional resources and the initial transmission of the portion is inefficient (e.g., a waste of resources).

Figure 2C:
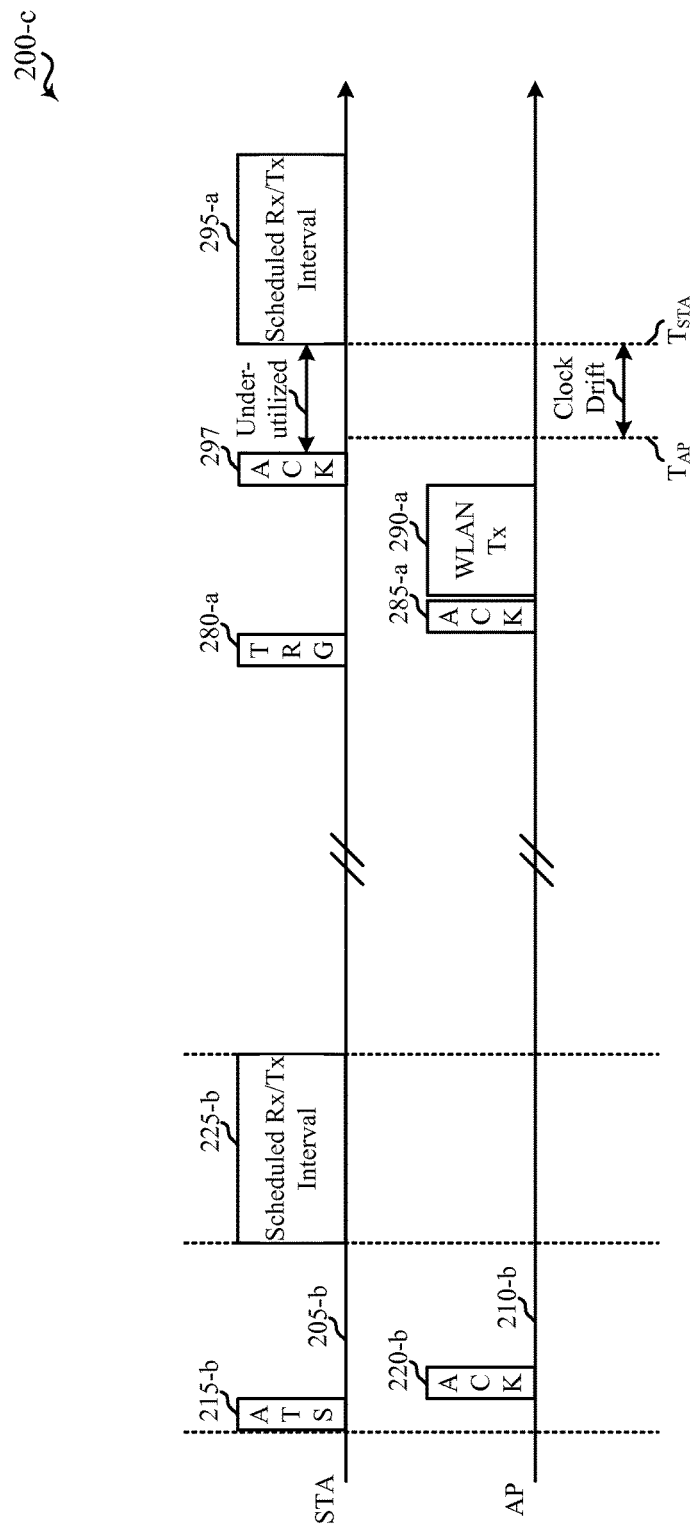
FIG. 2C shows a timing diagram illustrating a situation that may occur when the AP clock for WLAN communications is faster than the STA clock for communications via a different RAT.

FIG. 2C shows a timing diagram 200-c illustrating a situation that may occur when the AP clock for WLAN communications is faster than the STA clock for communications via a different RAT (e.g., LTE or BT). Similar to FIG. 2A, a timeline 205-b is shown for the STA and a timeline 210-b is shown for the AP. The STA may send an ATS frame 215-b to the AP to inform the AP of scheduled interference (e.g., Rx/Tx) intervals for communications via the different RAT. In response, the AP may send an acknowledgement (ACK) frame 220-b. As described above with respect to FIG. 2A, the AP should avoid transmitting to the STA during any scheduled Rx/Tx interval. Thus, no transmissions from the AP to the STA are shown during a first scheduled Rx/Tx interval 225-b.

A break in the timelines 205-b and 210-b illustrates an elapse of time sufficient for mutual clock drift between the STA's clock for the different RAT and the AP's TSF clock to adversely affect communications. After such an elapse of time, the STA may send a TRG frame 280-a to the AP to indicate that the STA is ready to receive a transmission from the AP. In response, the AP may transmit an ACK frame 285-a and then may transmit data to the STA via at least one WLAN Tx 290-a. With knowledge of a subsequent scheduled Rx/Tx interval 295-a, the AP may adjust the length/timing of the WLAN Tx 290-a. However, the AP may inaccurately estimate a beginning of the scheduled Rx/Tx interval 295-a to occur at a time $T_{AP}$ when the scheduled Rx/Tx interval 295-a actually begins at a time $T_{STA}$ according to the STA's clock for the different RAT. Such inaccuracy may result from the mutual clock drift, represented by the difference between $T_{AP}$ and $T_{STA}$ shown in FIG. 2C.

In such case, the mutual clock drift may result in an underutilization of medium time (illustrated by the time between an ACK frame 297 sent by the STA in response to the WLAN Tx 290-a and the actual beginning of the scheduled Rx/Tx interval 295-a). As such, additional data could have been transmitted via the WLAN Tx 290-a but for the inaccurate estimation by the AP.

Figure 2D:
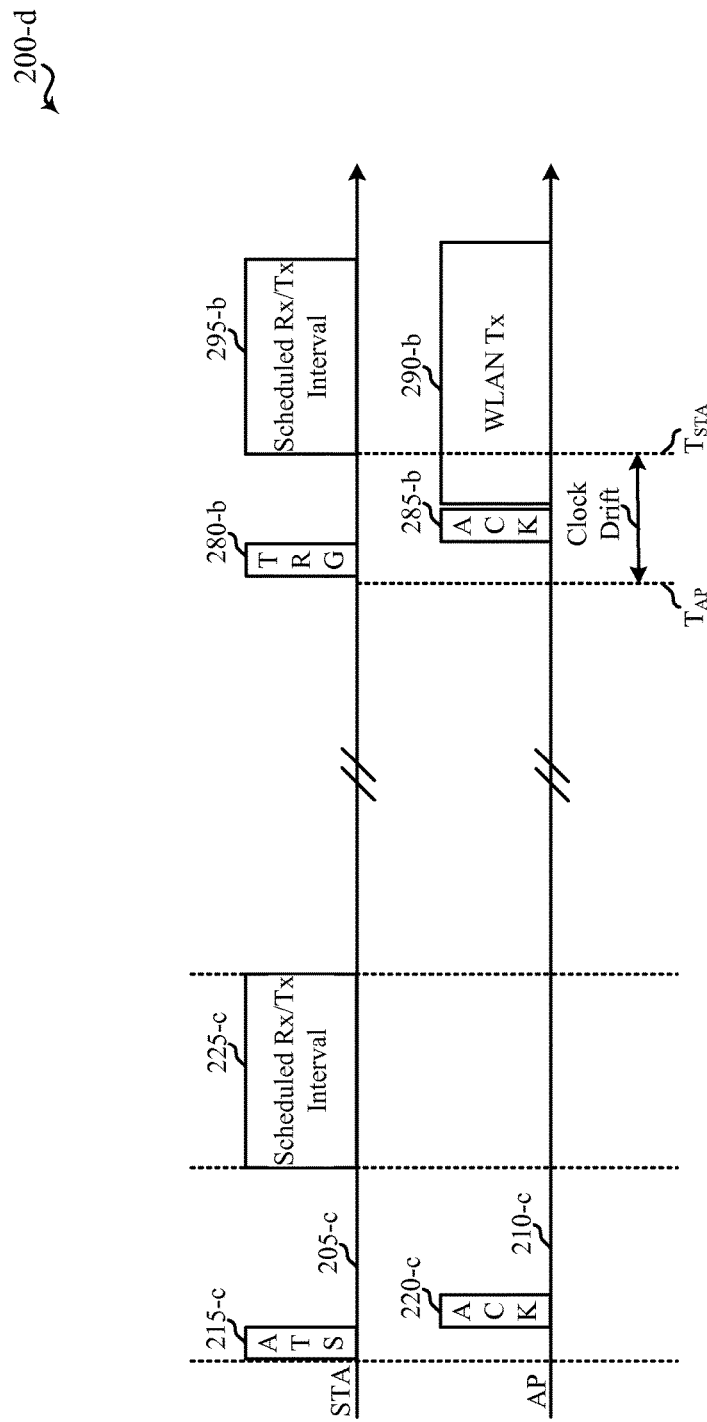
FIG. 2D shows a timing diagram illustrating another situation that may occur when the AP clock for WLAN communications is faster than the STA clock for communications via a different RAT.

FIG. 2D shows a timing diagram 200-d illustrating another situation that may occur when the AP clock for WLAN communications is faster than the STA clock for communications via a different RAT. Similar to FIG. 2A, a timeline 205-c is shown for the STA and a timeline 210-c is shown for the AP. The STA may send an ATS frame 215-c to the AP to inform the AP of scheduled interference (e.g., Rx/Tx) intervals for communications via the different RAT. In response, the AP may send an acknowledgement (ACK) frame 220-c. As described above with respect to FIG. 2A, the AP should avoid transmitting to the STA during any scheduled Rx/Tx interval. Thus, no transmissions from the AP to the STA are shown during a first scheduled Rx/Tx interval 225-c.

A break in the timelines 205-c and 210-c illustrates an elapse of time sufficient for mutual clock drift between the STA's clock for the different RAT and the AP's TSF clock to adversely affect communications. After such an elapse of time, the STA may send a TRG frame 280-b to the AP to indicate that the STA is ready to receive a transmission from the AP. In response, the AP may transmit an ACK frame 285-b and then may transmit data to the STA via at least one WLAN Tx 290-b. With knowledge of a subsequent scheduled Rx/Tx interval 295-b, the AP may adjust the length/timing of the WLAN Tx 290-b. However, the AP may inaccurately estimate a beginning of the scheduled Rx/Tx interval 295-b to occur at a time $T_{AP}$ when the scheduled Rx/Tx interval 295-a actually begins at a time $T_{STA}$ according to the STA's clock for the different RAT. Such inaccuracy may result from the mutual clock drift, represented by the difference between $T_{AP}$ and $T_{STA}$ shown in FIG. 2C.

In this example, the AP determines that the beginning of the scheduled Rx/Tx interval 295-b occurs at time $T_{AP}$, which is prior to the TRG frame 280-b being sent by the STA. As such, the AP may treat the TRG frame 280-b received from the STA as an indication that the scheduled Rx/Tx interval 295-b has ended. Thus, the AP may not correctly adjust the length/timing of the WLAN Tx 290-b to end prior to the actual beginning of the scheduled Rx/Tx interval 295-b.

In such case, the mutual clock drift may result in a portion (e.g., subframes) of the WLAN Tx 290-b colliding with communications via the different RAT occurring during the scheduled Rx/Tx interval 295-b (illustrated by the overlap in time). As such, the overlapping portion of the WLAN Tx 290 may not be successfully received by the STA.

Figure 3:
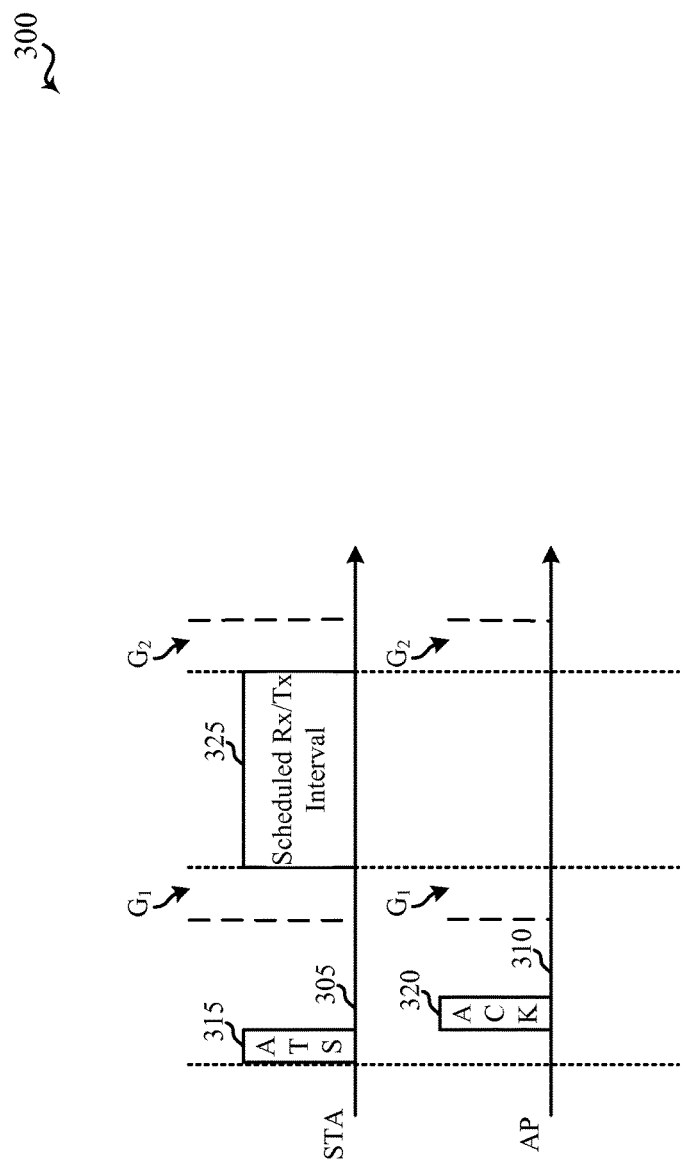
FIG. 3 shows a timing diagram illustrating use of a guard interval to manage clock drift for communications with a device having coexisting radios for different RATs, in accordance with various aspects of the present disclosure.

FIG. 3 shows a timing diagram 300 illustrating use of a guard interval to manage clock drift for communications with a device having coexisting radios for different RATs, in accordance with various aspects of the present disclosure. Similar to the foregoing FIGS. 2A-2D, a timeline 305 is shown for the STA and a timeline 310 is shown for the AP. The STA may send an ATS frame 315 to the AP to inform the AP of scheduled interference (e.g., Rx/Tx) intervals for communications via the different RAT. In response, the AP may send an ACK frame 320. As described above, the AP should avoid transmitting to the STA during any scheduled Rx/Tx interval. Thus, no transmissions from the AP to the STA are shown during a first scheduled Rx/Tx interval 325.

In this case, however, guard intervals $G_1$ and $G_2$ may be determined and applied before and after, respectively, the first scheduled Rx/Tx interval 325. Although not shown, the guard intervals $G_1$ and $G_2$ may be similarly applied before and after each of a plurality of scheduled Rx/Tx intervals for the STA. As described further herein, employing such guard intervals may allow the STA and the AP to be resynchronized (e.g., via ATS frames from the STA to the AP) less often while still avoiding collisions between communications via different RATs and/or underutilization of medium time that may otherwise result from mutual clock drift, such as described above with respect to FIGS. 2B-2D, for example.

As with scheduled Rx/Tx intervals, the AP should avoid transmitting to the STA during guard intervals. Thus, a guard interval for the STA may define a non-transmission time interval to the STA for the AP. In some cases, the guard interval may indicate to the STA a time interval during which the STA should not send a trigger (e.g., a TRG frame) to the AP for a WLAN transmission to be sent from the AP. Alternatively or additionally, the guard interval may indicate to the AP a time interval during which any trigger received from the STA is to be ignored (e.g., the AP should not send a transmission to the STA in response to any trigger received from the STA during the guard interval).

Thus, the AP may send a WLAN transmission to the STA based at least in part on the scheduled interference interval(s) for the first (WCD) and the applied guard interval(s). In some cases, it may be sufficient to employ guard interval $G_1$ before the start of each scheduled Rx/Tx interval. The AP also may maintain the guard interval $G_2$ after the start of each scheduled Rx/Tx interval. The AP may not start transmissions to the STA upon receiving a trigger frame during the guard interval $G_2$, to avoid the problem illustrated in FIG. 2D, for example.

A length of the guard intervals may be determined in any suitable manner. For example, clock drift bounds defined or specified in the standards for the respective RATs (e.g., WLAN, BT, LTE, etc.) may be used. In such case, a "worst case scenario" (e.g., maximum mutual clock drift) approach may be employed. Alternatively, clock drift for the TSF clock of the AP and/or for the different RAT clock of the STA may be determined using information regarding the actual hardware employed at the AP/STA, for example, based on the oscillators being used. In some cases, a length of the guard intervals may be specified in a technical standard followed by the STA and the AP (e.g., 802.11, etc.). As discussed further herein, the AP, the STA, or both the AP and the STA may be involved in determining the length of the guard intervals.

Figure 4:
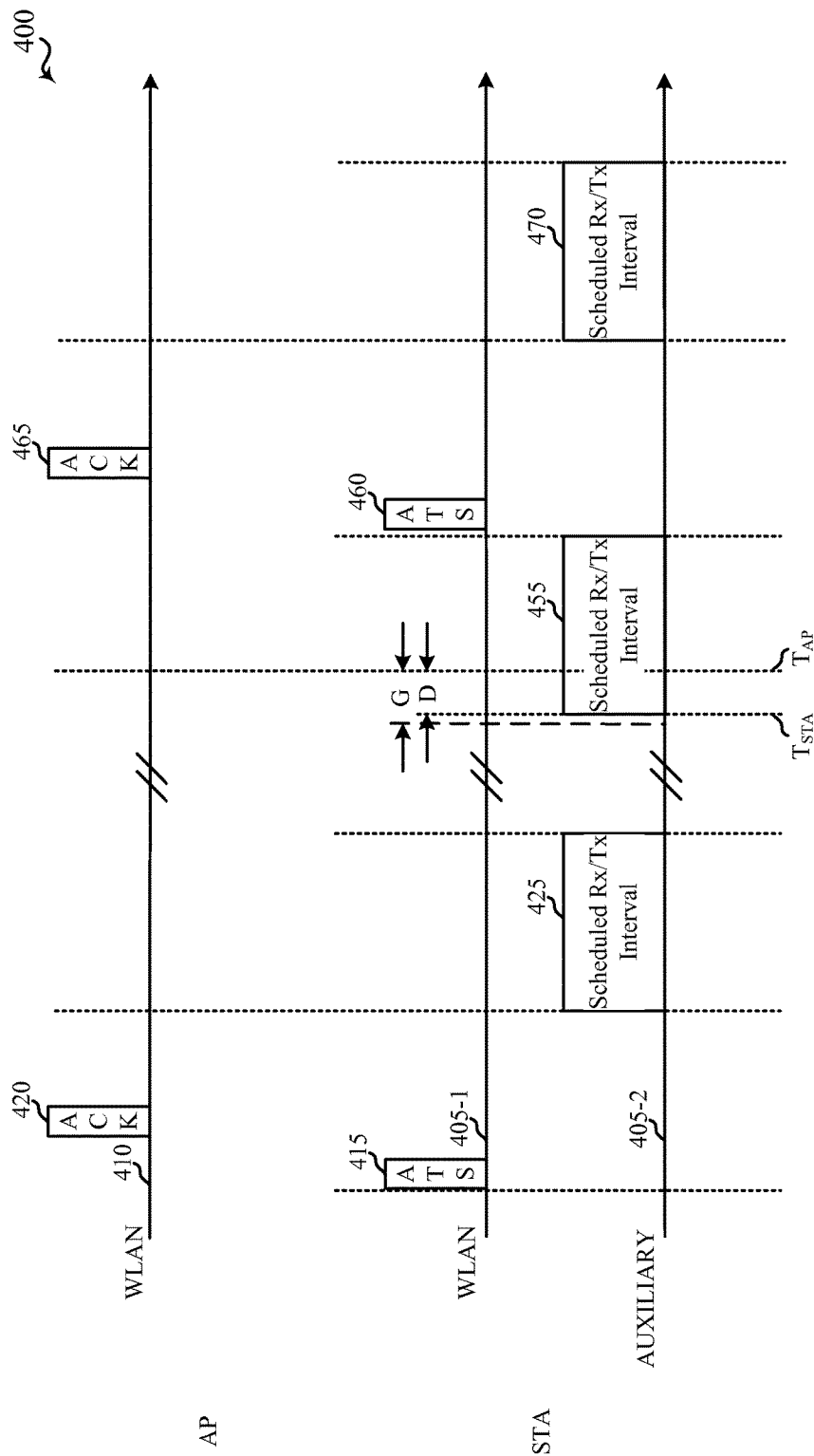
FIG. 4 shows another timing diagram illustrating use of a guard interval to manage clock drift for communications with a device having coexisting radios for different RATs, in accordance with various aspects of the present disclosure.

FIG. 4 shows another timing diagram 400 illustrating use of a guard interval G to manage clock drift D for communications with a STA having coexisting radios for different RATs, in accordance with various aspects of the present disclosure. In FIG. 4, a timeline 405-1 for WLAN communications and a timeline 405-2 for auxiliary (e.g., BT or LTE, etc.) is shown for the STA. Also, a timeline 410 for WLAN communications is shown for the AP.

The STA may send an ATS frame 415 to the AP to inform the AP of scheduled interference (e.g., Rx/Tx) intervals for communications via the different RAT. In response, the AP may send an ACK frame 420. As described above, the AP should avoid transmitting to the STA during any scheduled Rx/Tx interval. Thus, no transmissions from the AP to the STA are shown during a first scheduled Rx/Tx interval 425. For the sake of simplicity, no guard intervals are shown with respect to the first scheduled Rx/Tx interval 425.

A break in the timelines 405-1, 405-2 and 410 illustrates an elapse of time that, absent the use of guard intervals, may be sufficient for mutual clock drift between the STA's clock for the different RAT and the AP's TSF clock to adversely affect communications. After such an elapse of time, the AP may inaccurately estimate a beginning of a scheduled Rx/Tx interval 455 to occur at a time $T_{AP}$ when the scheduled Rx/Tx interval 455 actually begins at a time $T_{STA}$ according to the STA's clock for the different RAT. In this case, the mutual clock drift D (the difference between $T_{STA}$ and $T_{AP}$ shown in FIG. 4) may be effectively dealt with by the guard interval G.

At this point however, the clock drift D may be considered to have approached sufficiently close to the guard interval G. For example, the clock drift D may be within a threshold value (e.g., time) such that resynchronization may be desirable to avoid the clock drift D exceeding the guard interval G and rendering the guard interval G ineffective. For example, the STA may monitor the mutual clock drift and may send a communication for resynchronization based on the clock drift and the guard interval. The STA may determine a clock drift value (e.g., time), for example, using the monitored mutual clock drift, and may compare the clock drift value to a value (e.g., time) of the guard interval. Based on a result of the comparison, the STA may determine whether to send the communication for resynchronization.

In the example of FIG. 4, it is assumed that the difference between the clock drift D and the guard interval G satisfies a predetermined threshold (e.g., is less than the threshold) for the scheduled Rx/Tx interval 455. Thus, after the scheduled Rx/Tx interval 455, the STA may send an ATS frame 460 (followed by a corresponding ACK frame 465 from the AP) for resynchronization. For example, the ATS frame 460 may include an update to the timing of a subsequent scheduled Rx/Tx interval 470 (as well as others, not shown). Again, the guard interval(s) for the subsequent scheduled Rx/Tx interval 470 is/are not shown for the sake of simplicity.

Figure 5A:
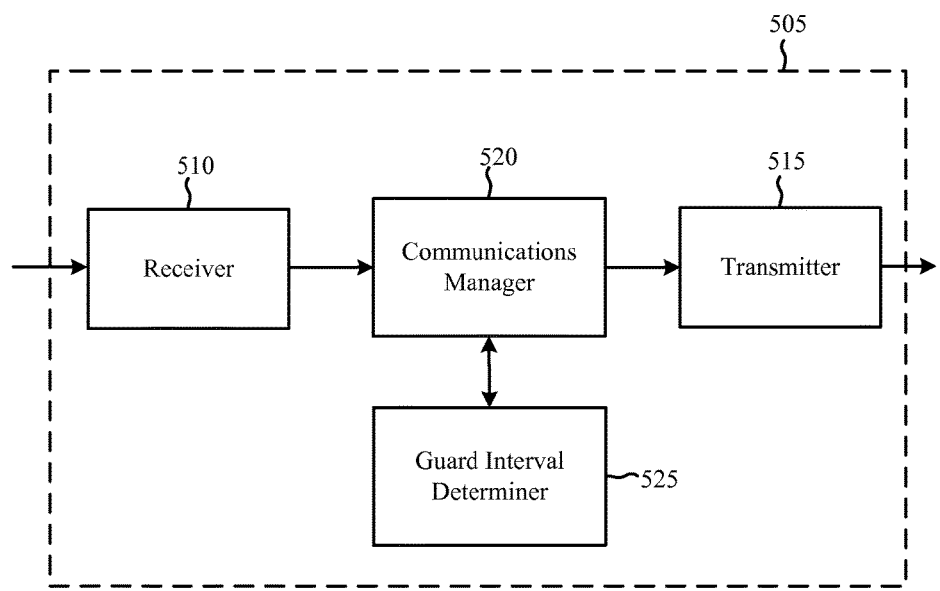
FIG. 5A shows a block diagram of a device for use in wireless communication, in accordance with various aspects of the present disclosure.

FIG. 5A shows a block diagram 500-a of a device 505 for use in a station for wireless communication, in accordance with various aspects of the present disclosure. In some implementations, the device 505 may be an example of aspects of the wireless stations 110 described with reference to FIG. 1 and may implement various aspects described with respect to the STAs in FIGS. 2A, 3 and 4. The device 505 may also be or include a processor (not shown). The device 505 may include a receiver 510, a transmitter 515, a communications manager 520, and/or a guard interval determiner 525. Each of these components may be in communication with each other.

The device 505, through the receiver 510, the transmitter 515, the communications manager 520, and/or the guard interval determiner 525, may perform functions described herein. For example, the device 505 may identify or otherwise determine a guard interval, apply the guard interval relative to a scheduled interference interval, receive transmissions in accordance with the guard interval and the scheduled interference interval, monitor mutual clock drift, and/or send a communication resynchronization in accordance with the mutual clock drift and the guard interval.

The components of the device 505 (as well as those of other related devices/apparatus described herein) may, individually or collectively, be implemented using ASICs adapted to perform some or all of the applicable functions in hardware. Alternatively, the functions may be performed by other processing units (or cores), on integrated circuits. In other examples, other types of integrated circuits may be used (e.g., Structured/Platform ASICs, FPGAs, and other Semi-Custom ICs), which may be programmed in any manner known in the art. The functions of each component may also be implemented, in whole or in part, with instructions embodied in a memory, formatted to be executed by general or application-specific processors.

The receiver 510 may receive information such as packets, user data, and/or control information associated with various information channels (e.g., control channels, data channels, etc.). The receiver 510 may receive AP beacons, probe responses and other communications (e.g., data) via a first RAT such as WLAN. The receiver 510 also may receive various communications via a second RAT such as BT or LTE, for example. Although only the single receiver 510 is shown, it should be understood that the receiver 510 may be implemented using separate receivers for the different RATs (e.g., as part of different radios for the respective RATs). Information may be passed on to the communications manager 520, and to other components of the device 505.

The transmitter 515 may transmit the signals received from other components of the device 505. The transmitter 515 may transmit various communications (e.g., ATS/ADDTS frames, ACK frames, data, etc.) via a first RAT such as WLAN. The transmitter 515 also may transmit various communications via a second RAT such as BT or LTE, for example. Although only the single transmitter 515 is shown, it should be understood that the transmitter 515 may be implemented using separate transmitters for the different RATs (e.g., as part of different radios for the respective RATs). In some examples, the transmitter 515 may be collocated with the receiver 510 in a transceiver (whether that is as a single transceiver capable of operating according to multiple RATs or a plurality of transceivers each of which operates according to a particular RAT). The transmitter 515 may include a single antenna, or it may include a plurality of antennas. The transmitter 515 also may share the antenna(s) with the receiver 510.

The communications manager 520 may be used to manage wireless communication according to each of a plurality of RATs, e.g., WLAN, BT, LTE, etc. For example, the communications manager 520 may be used to manage the transmitter 515 and/or the receiver 510. According to aspects of this disclosure, the communications manager 520 may manage or otherwise control the timing or scheduling of communications. Further, the communications manager 520 may manage other aspects for communicating according to the different RATs, such as identifying/determining a guard interval, applying the guard interval, monitoring mutual clock drift, etc.

The guard interval determiner 525 may operate in any suitable manner to identify, obtain or otherwise determine a guard interval for the device 505. For example, the guard interval determiner 525 may receive information via the receiver 510, such as a guard interval announced by an AP, or system information such as standards for clock drifts according to the different RATs that may be used to determine a length or time of the guard interval. Alternatively or additionally, the guard interval determiner 525 may determine the length/time of the guard interval using information stored locally, such as in memory (not shown) of the device 505. In some cases, the length/time of the guard interval may be predetermined for the particular RATs being employed (e.g., managed by the communications manager 520).

Once the guard interval is determined by the guard interval determiner 525, the communications manager 520 may apply the determined guard interval relative to a scheduled interference (e.g., Rx/Tx) interval for a particular RAT (e.g., BT, LTE, etc.) such as described above with respect to FIG. 3. The communications manager 520 also may monitor the mutual clock drift, such as described herein, and send a communication to the AP for resynchronization (e.g., providing an update for the scheduled interference intervals) in accordance with the mutual clock drift and the guard interval.

Figure 5B:
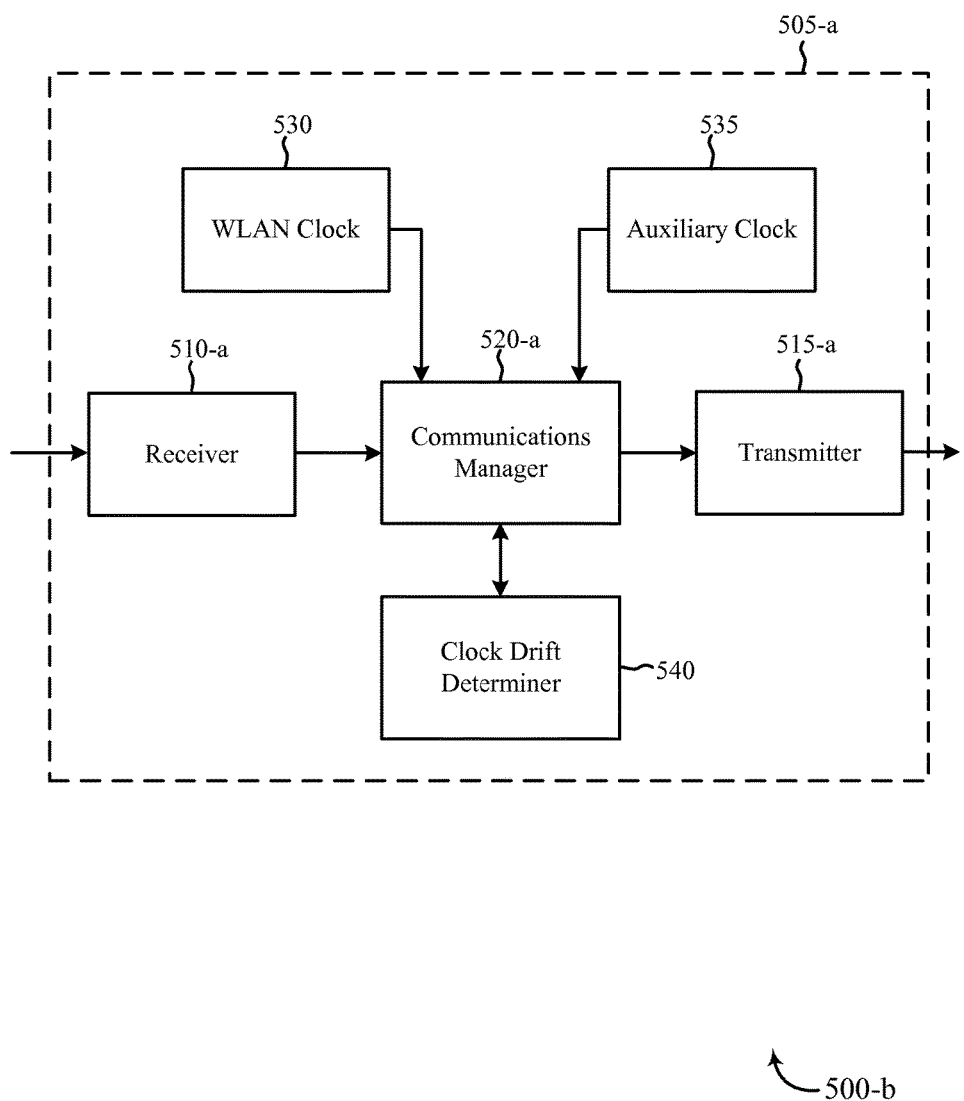
FIG. 5B shows a block diagram of another device for use in wireless communication, in accordance with various aspects of the present disclosure.

FIG. 5B shows a block diagram 500-b of another device 505-a for use in a station for wireless communication, in accordance with various aspects of the present disclosure. In some implementations, the device 505-a may be an example of aspects of the wireless stations 110 described with reference to FIG. 1, may implement various aspects described with respect to the STAs in FIGS. 2A, 3 and 4, and may be an example of the device 505 described with reference to FIG. 5A. The device 505-a may also be or include a processor (not shown). The device 505-a may include a receiver 510-a, a transmitter 515-a, a communications manager 520-a, a WLAN clock 530, an auxiliary clock 535, and/or a clock drift determiner 540. Each of these components may be in communication with each other.

The device 505-a may perform various functions described herein. The receiver 510-a, the transmitter 515-a, and the communications manager 520-a may operate as described above with respect to FIG. 5A, for example. The communications manager 520-a may use the WLAN clock 530 to manage (e.g., schedule, transmit and/or receive) wireless communication via WLAN and may use the auxiliary clock 535 to manage wireless communication via a different RAT (e.g., BT or LTE, etc.). Further, the communications manager 520-*a* may manage other aspects for communicating according to the different RATs, such as identifying/determining a guard interval and applying the guard interval.

The clock drift determiner 540, either alone or in combination with the communications manager 520-*a*, may monitoring mutual clock drift between the auxiliary clock 535 and the WLAN clock of the AP (e.g., the TSF clock). For example, the clock drift determiner 540 may calculate a clock drift value (e.g., periodically or at specified times, such as at the beginnings of scheduled interference intervals for the different RAT), and may compare the clock drift value to the guard interval (e.g., calculate a difference between the current clock drift value and the applied guard interval). The clock drift determiner 540 and/or the communications manager 520-*a* may compare the difference between the current clock drift value and the applied guard interval to a threshold value. When the difference is less than the threshold value (e.g., satisfies a threshold), the communications manager 520-*a* may send a communication to the AP to resynchronize with the AP and eliminate the mutual clock drift.

In this example, the communications manager 520-*a* may operate in any suitable manner to identify, obtain or otherwise determine a guard interval for the device 505-*a*. For example, the communications manager 520-*a* may determine a local guard interval for the device 505-*a* based on an attribute of the auxiliary clock 535, such as a clock drift associated with the particular hardware (e.g., oscillator) used to implement the auxiliary clock 535. The device 505-*a*, via the communications manager 520-*a* and the transmitter 515-*a*, may inform or notify the AP of the guard interval to apply for WLAN communications with the device 505-*a*.

Additionally, the communications manager 520-*a* may receive information via the receiver 510-*a*, such as a guard interval announced by an AP. In such case, the device 505-*a* may override the guard interval announced by the AP with the local guard interval determined at the device 505-*a*. For example, the device 505-*a* may instruct the AP to use the local guard interval (instead of the guard interval determined at the AP) for WLAN communications with the device 505-*a*.

Figure 6:
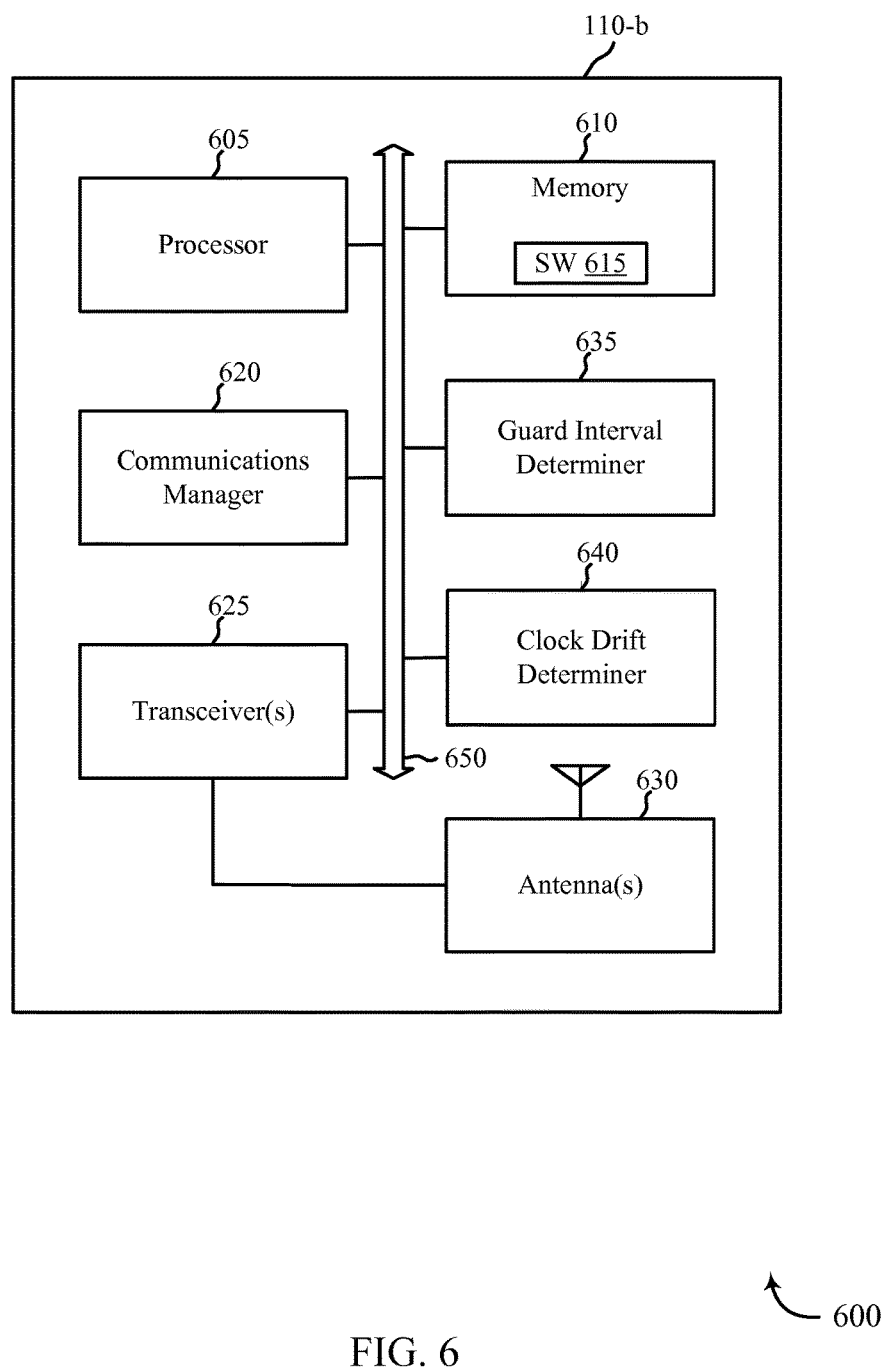
FIG. 6 shows a block diagram of an apparatus for use in wireless communication, in accordance with various aspects of the present disclosure.

Turning to FIG. 6, a block diagram 600 is shown that illustrates a wireless station 110-*b* for communicating via coexisting RATs (e.g., WLAN and BT or LTE). The wireless station 110-*a* may have various other configurations and may be included or be part of a personal computer (e.g., laptop computer, netbook computer, tablet computer, etc.), a cellular telephone, a PDA, a digital video recorder (DVR), an internet appliance, a gaming console, an e-readers, etc. The wireless station 110-*a* may have an internal power supply (not shown), such as a small battery, to facilitate mobile operation. The wireless station 110-*a* may be an example of the wireless stations 110 of FIG. 1, may implement various aspects described with respect to the STAs in FIGS. 2A, 3 and 4, and may be an example of the devices 505 and 505-*a* described with reference to FIGS. 5A and 5B, respectively.

The wireless station 110-*b* may include a processor 605, a memory 610, at least one transceiver 625 and at least one antenna 630. Each of these components may be in communication with each other, directly or indirectly, over at least one bus 650.

The memory 610 may include random access memory (RAM) and read-only memory (ROM). The memory 610 may store computer-readable, computer-executable software (SW) code 615 containing instructions that, when executed, cause the processor 605 to perform various functions described herein for communicating via coexisting RATs. Alternatively, the software code 615 may not be directly executable by the processor 605 but may cause the wireless station 110-*b* or components thereof (e.g., when compiled and executed) to perform functions described herein.

The processor 605 may include an intelligent hardware device, e.g., a CPU, a microcontroller, an ASIC, etc. The processor 605 may process information received through the transceiver(s) 625 and/or to be sent to the transceiver(s) 625 for transmission through the antenna(s) 630. The processor 605 may handle, alone or in connection with other components, various aspects for communicating via coexisting RATs.

The transceiver(s) 625 may communicate bi-directionally with APs, such as described above with reference to FIGS. 1, 2A, 3 and 4. The transceiver(s) 625 may be implemented as at least one transmitter module and at least one separate receiver module. The transceiver(s) 625 may include a modem to modulate the packets and provide the modulated packets to the antenna(s) 630 for transmission, and to demodulate packets received from the antenna(s) 630. While the wireless station 110-*a* may include a single antenna, there may be aspects in which the wireless station 110-*a* may include multiple antennas 630.

According to the architecture of FIG. 6, the wireless station 110-*a* further may include a communications manager 620. The communications manager 620 may manage communications with various access points. The communications manager 620 may be a component of the wireless station 110-*a* in communication with some or all of the other components of the wireless station 110-*a* over the bus 650. Alternatively, functionality of the communications manager 620 may be implemented as a component of the transceiver(s) 625, as a computer program product, and/or as at least one controller element of the processor 605.

The wireless station 110-*a* also may include a guard interval determiner 635 and a clock drift determiner 640. The guard interval determiner 635 and the clock drift determiner 640 may be components of the wireless station 110-*a* in communication with some or all of the other components of the wireless station 110-*a* over the bus 650. Alternatively, functionality of the guard interval determiner 635 and the clock drift determiner 640 may be implemented as a component of the transceiver(s) 625, as a computer program product, and/or as at least one controller element of the processor 605.

The components of the wireless station 110-*a* may implement aspects discussed above with respect to FIGS. 5A and 5B, and those aspects may not be repeated here for the sake of brevity. Moreover, the components of the wireless station 110-*a* may implement aspects discussed below with respect to FIGS. 8, 10, 11 and 12, and those aspects may not be repeated here also for the sake of brevity.

Figure 7:
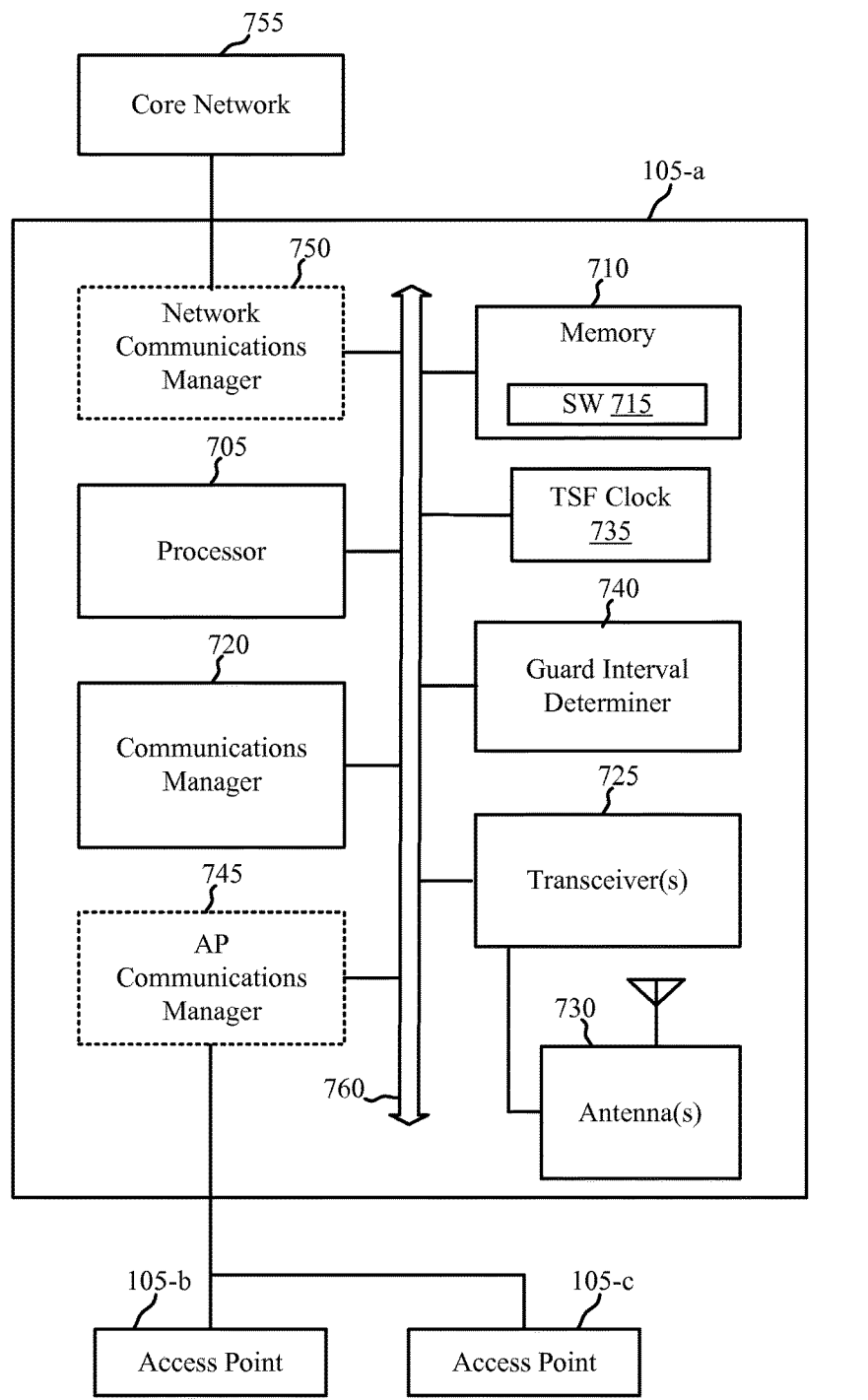
FIG. 7 shows a block diagram of another apparatus for use in wireless communication, in accordance with various aspects of the present disclosure.

Turning to FIG. 7, a block diagram 700 is shown that illustrates an access point or AP 105-*a* for communicating with a station having coexisting RATs (e.g., WLAN and BT or LTE). In some aspects, the AP 105-*a* may be an example of the AP 105 of FIG. 1, and may implement various aspects of the APs discussed above with respect to FIGS. 2A, 3 and 4. The AP 105-*a* may include a processor 705, a memory 710, at least one transceiver 725, at least one antenna 730, and a TSF clock 735. Each of these components may be in communication with each other, directly or indirectly, over at least one bus 760.

The memory 710 may include RAM and ROM. The memory 710 may also store computer-readable, computer-executable software (SW) code 715 containing instructions that, when executed, cause the processor 705 to perform various functions described herein for communicating with a station having coexisting RATs, for example. Alternatively, the software code 715 may not be directly executable by the processor 705 but may cause the AP 105-a or components thereof, e.g., when compiled and executed, to perform functions described herein.

The processor 705 may include an intelligent hardware device, e.g., a central processing unit (CPU), a microcontroller, an ASIC, etc. The processor 705 may process information received through the transceiver(s) 725. The processor 705 may also process information to be sent to the transceiver(s) 725 for transmission through the antenna(s) 730. The processor 705 may handle, alone or in connection with other components, various aspects related to communicating with a station having coexisting RATs. For example, the processor 705 may handle the timing of WLAN communications using the TSF clock 735, and may determine and implement a guard interval, in conjunction with a guard interval determiner 740, for communicating with at least one station.

The transceiver(s) 725 may include a modem to modulate the packets and provide the modulated packets to the antenna(s) 730 for transmission, and to demodulate packets received from the antenna(s) 730. The transceiver(s) 725 may be implemented as at least one transmitter module and at least one separate receiver module. The transceiver(s) 725 may communicate bi-directionally, via the antenna(s) 730, with at least one wireless station 110 as illustrated in FIG. 1 and described with respect to FIGS. 2A, 3 and 4, for example. The AP 105-a may typically include multiple antennas 730 (e.g., an antenna array). The AP 105-a may communicate with other APs, such as the access point 105-b and the access point 105-c, using an APs communications manager 745. The AP 105-a also may communicate with a core network 755 through a network communications manager 750.

According to the architecture of FIG. 7, the AP 105-a further may include a communications manager 720 for managing WLAN communications with stations and/or other devices, such as illustrated in the WLAN network 100 of FIG. 1. The communications manager 720 may be in communication with some or all of the other components of the AP 105-a via the bus 760. Alternatively, functionality of the communications manager 720 may be implemented as a component of the transceiver(s) 725, as a computer program product, and/or as at least one controller element of the processor 705.

The components of the AP 105-a may implement aspects discussed above with respect FIGS. 1, 2A, 3 and 4, and those aspects may not be repeated here for the sake of brevity. Moreover, the components of the AP 105-a may implement aspects discussed below with respect to FIGS. 8 and 9, and those aspects may not be repeated here also for the sake of brevity.

Figure 8:
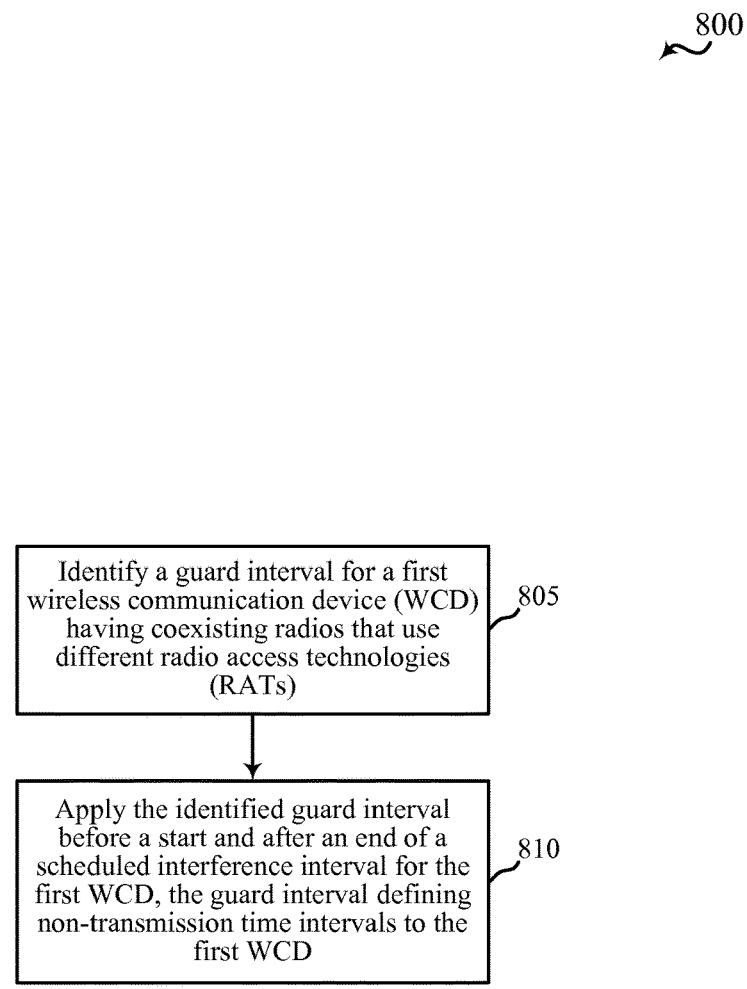
FIG. 8 is a flow chart illustrating an example of a method for wireless communication, in accordance with various aspects of the present disclosure.

FIG. 8 is a flow chart illustrating an example of a method 800 for wireless communication, in accordance with various aspects of the present disclosure. For clarity, the method 800 is described below with reference to aspects of the APs or STAs described with reference to FIGS. 1, 2A, 3 and 4, and/or aspects of the devices/apparatus described with reference to FIGS. 5A, 5B, 6 and 7. In some examples, an AP or STA may execute various sets of codes to control the functional elements of the AP or STA, respectively, to perform the functions described below. Additionally or alternatively, the AP or STA may perform various of the functions described below using-purpose hardware.

At block 805, a guard interval may be identified for a first wireless communication device (WCD, such as a STA) having coexisting radios that use different radio access technologies (RATs). As described above, identifying the guard interval may involve receiving a guard interval from a different device, receiving information for determining the guard interval (e.g., clock drift specifications associated with the RATs being used), obtaining a predetermined guard interval (e.g., for the RATs being used), or determining the guard interval based on an attribute of the hardware implementing the clock for the different RAT (e.g., BT or LTE, etc.).

Then, at block 810, the identified guard interval may be applied before and after a start of a scheduled interference interval for the first WCD. As described above, the guard interval may define non-transmission time intervals (e.g., for WLAN communications from the AP) to the first WCD. Such application may be performed such as described with respect to FIGS. 3 and 4, for example.

The operation(s) at block 805 may be performed using the communications manager 520/520-a/620/720 and/or the guard interval determiner 525/740 described with reference to FIGS. 5A, 5B, 6 and 7. The operation(s) at block 810 may be performed using the communications manager 520/520-a/620/720 described with reference to FIGS. 5A, 5B, 6 and 7.

Thus, the method 800 may provide for wireless communications between an AP and a STA having coexisting radios that use different RATs. It should be noted that the method 800 is just one implementation and that the operations of the method 800 may be rearranged or otherwise modified such that other implementations are possible.

Figure 9:
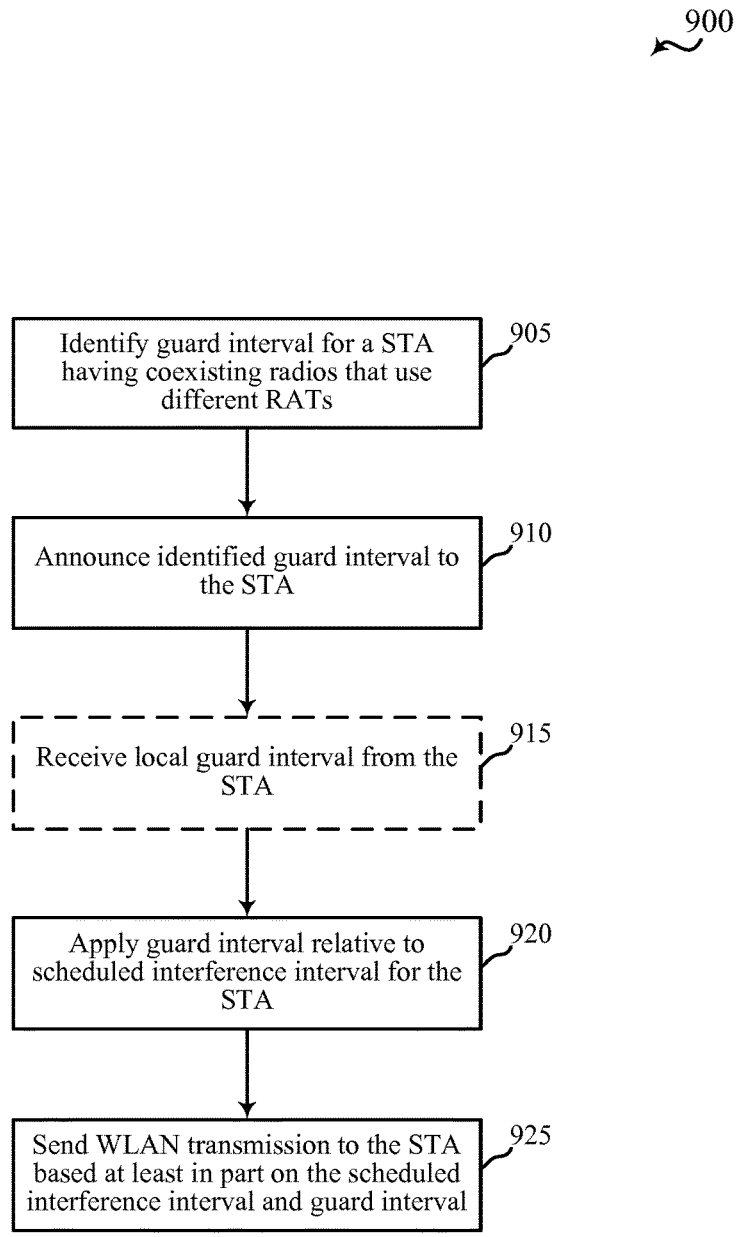
FIG. 9 is a flow chart illustrating another example of a method for wireless communication, in accordance with various aspects of the present disclosure.

FIG. 9 is a flow chart illustrating an example of a method 900 for wireless communication, in accordance with various aspects of the present disclosure. For clarity, the method 900 is described below with reference to aspects of the APs described with reference to FIGS. 1, 2A, 3 and 4, and/or aspects of the apparatus described with reference to FIG. 7. In some examples, an AP may execute various sets of codes to control the functional elements of the AP to perform the functions described below. Additionally or alternatively, the AP may perform various of the functions described below using-purpose hardware.

At block 905, a guard interval may be identified for a STA having coexisting radios that use different radio access technologies (RATs). As described above, identifying the guard interval may involve receiving a guard interval from the STA, receiving information for determining the guard interval (e.g., clock drift specifications associated with the RATs being used), or obtaining a predetermined guard interval (e.g., for the RATs being used). The guard interval may be common to all STAs within the WLAN network, or may be specific to the particular station (e.g., determined on a per-association basis).

Then, at block 910, the identified guard interval may be announced to the STA, for example, via an AP beacon or in a message in response to a probe request from the STA. Optionally, at block 915, a local guard interval may be received from the STA. The local guard interval may supplant or override the guard interval identified at block 905, as appropriate or desired for a given implementation. For example, if the guard interval is to be common to all STAs within the network, then the local guard interval may be rejected (e.g., with the AP notifying the STA that the local guard interval is not adopted). Alternatively, the local guard interval may be accepted for the particular STA, with the guard interval identified at block 905 being used for STAs not providing a local guard interval.

At block 920, the guard interval (either from block 905 or from block 915) may be applied before and after a start of a scheduled interference interval for the STA(s). Then, at block 925, a WLAN transmission may be sent to the STA(s) in accordance with the applied guard interval and the scheduled interference interval for the STA(s).

The operations of the method 900 may be performed using various components of the AP described with reference to FIG. 7, for example. Thus, the method 900 may provide for wireless communications between an AP and a STA having coexisting radios that use different RATs. It should be noted that the method 900 is just one implementation and that the operations of the method 900 may be rearranged or otherwise modified such that other implementations are possible.

Figure 10:
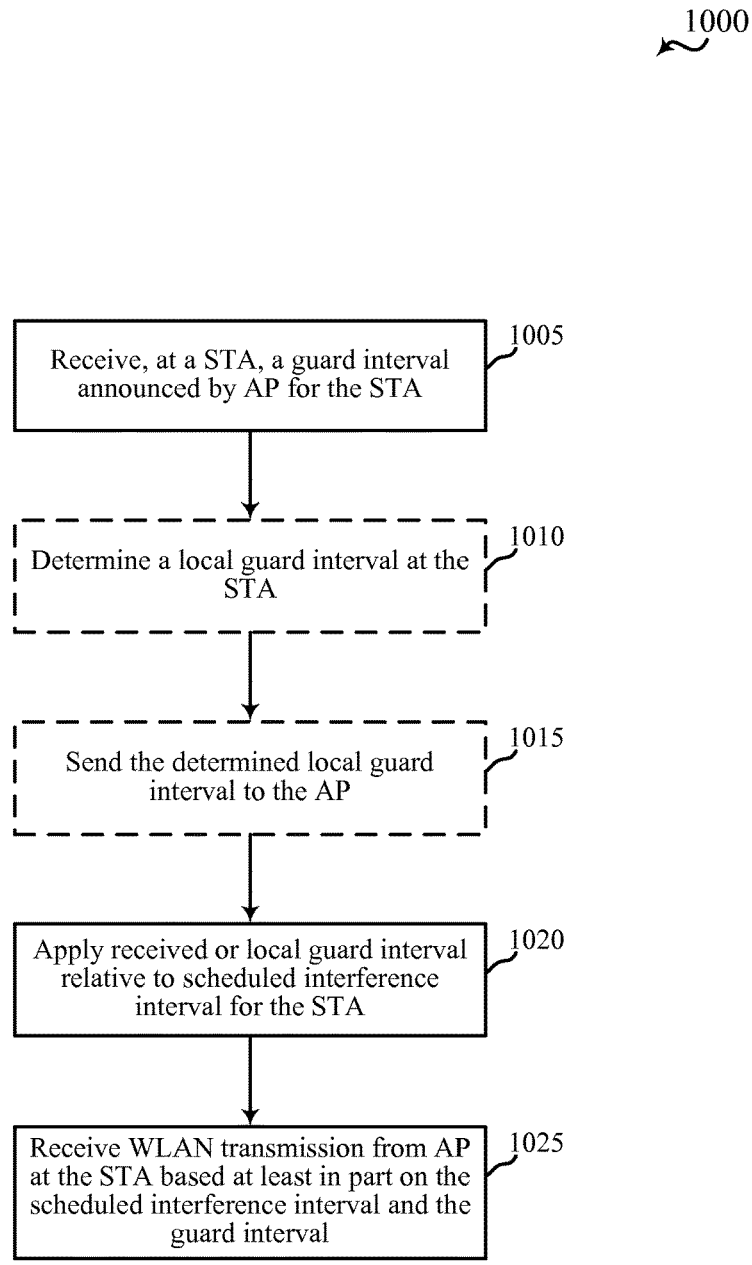
FIG. 10 is a flow chart illustrating yet another example of a method for wireless communication, in accordance with various aspects of the present disclosure.

FIG. 10 is a flow chart illustrating an example of a method 1000 for wireless communication, in accordance with various aspects of the present disclosure. For clarity, the method 1000 is described below with reference to aspects of the STAs described with reference to FIGS. 1, 2A, 3 and 4, and/or aspects of the devices/apparatus described with reference to FIGS. 5A, 5B and 6. In some examples, a STA may execute various sets of codes to control the functional elements of the STA to perform the functions described below. Additionally or alternatively, the STA may perform various of the functions described below using-purpose hardware.

At block 1005, the STA may receive a guard interval announced by an AP, for example, via a beacon or probe response. Optionally, at block 1010, a local guard interval may be determined at the STA. In such case, the method 1000 may include block 1015, where the STA may send the local guard interval to the AP, for example, to override the guard interval received at block 1005, as appropriate or desired for a given implementation.

At block 1020, the guard interval (either from block 1005 or from block 1010) may be applied before and after a start of a scheduled interference interval for the STA(s). Then, at block 1025, a WLAN transmission may be received by the STA(s) in accordance with the applied guard interval and the scheduled interference interval for the STA(s).

The operations of the method 1000 may be performed using various components of the STA described with reference to FIGS. 5A, 5B, 6 and 7, for example. Thus, the method 1000 may provide for wireless communications between an AP and a STA having coexisting radios that use different RATs. It should be noted that the method 1000 is just one implementation and that the operations of the method 1000 may be rearranged or otherwise modified such that other implementations are possible.

Figure 11:
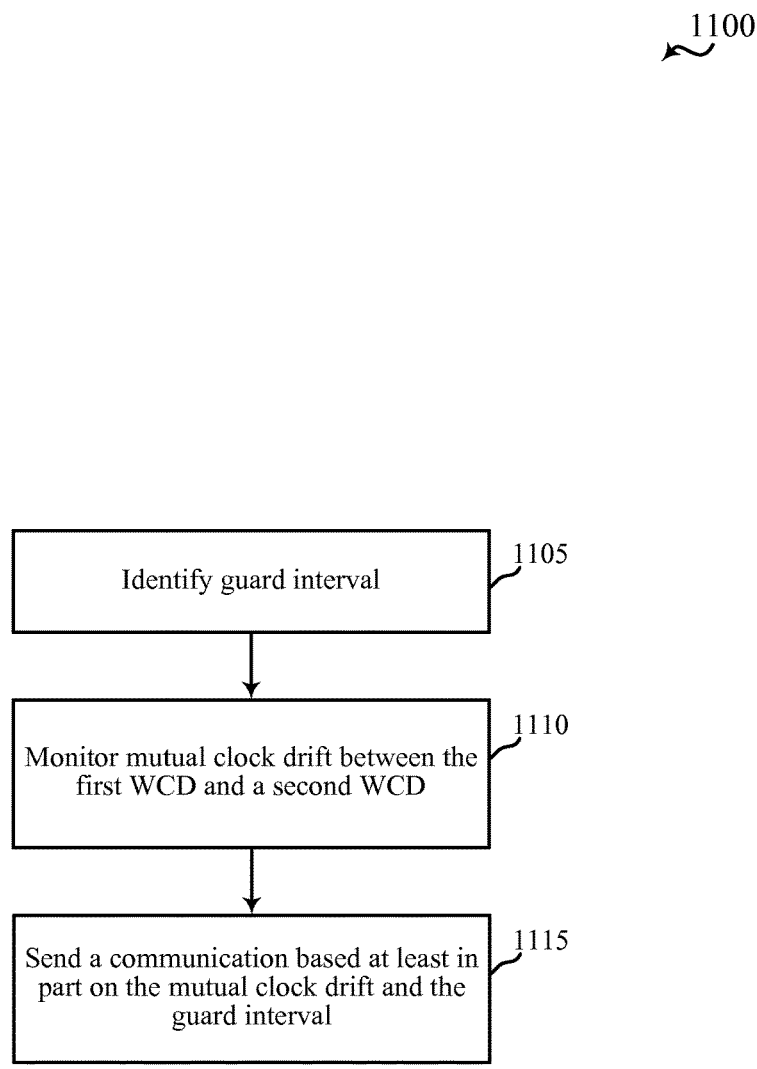
FIG. 11 is a flow chart illustrating still another example of a method for wireless communication, in accordance with various aspects of the present disclosure.

FIG. 11 is a flow chart illustrating an example of a method 1100 for wireless communication, in accordance with various aspects of the present disclosure. For clarity, the method 1100 is described below with reference to aspects of the STAs described with reference to FIGS. 1, 2A, 3 and 4, and/or aspects of the devices/apparatus described with reference to FIGS. 5A, 5B and 6. In some examples, a STA may execute various sets of codes to control the functional elements of the STA to perform the functions described below. Additionally or alternatively, the STA may perform various of the functions described below using-purpose hardware.

At block 1105, the STA may identify a guard interval, for example, announced by an AP or determined at the STA (e.g., a local guard interval specific to the STA). At block 1110, the STA may monitor mutual clock drift between the TSF clock of the AP and the local clock used for the different RAT (e.g., BT or LTE, etc.). Then, based on the monitored mutual clock drift and the identified guard interval, the STA may send a communication to the AP for resynchronization (e.g., providing an update for the scheduled interference intervals).

The operations of the method 1100 may be performed using various components of the STA described with reference to FIGS. 5A, 5B, 6 and 7, for example. Thus, the method 1100 may provide for wireless communications between an AP and a STA having coexisting radios that use different RATs. It should be noted that the method 1100 is just one implementation and that the operations of the method 1100 may be rearranged or otherwise modified such that other implementations are possible.

Figure 12:
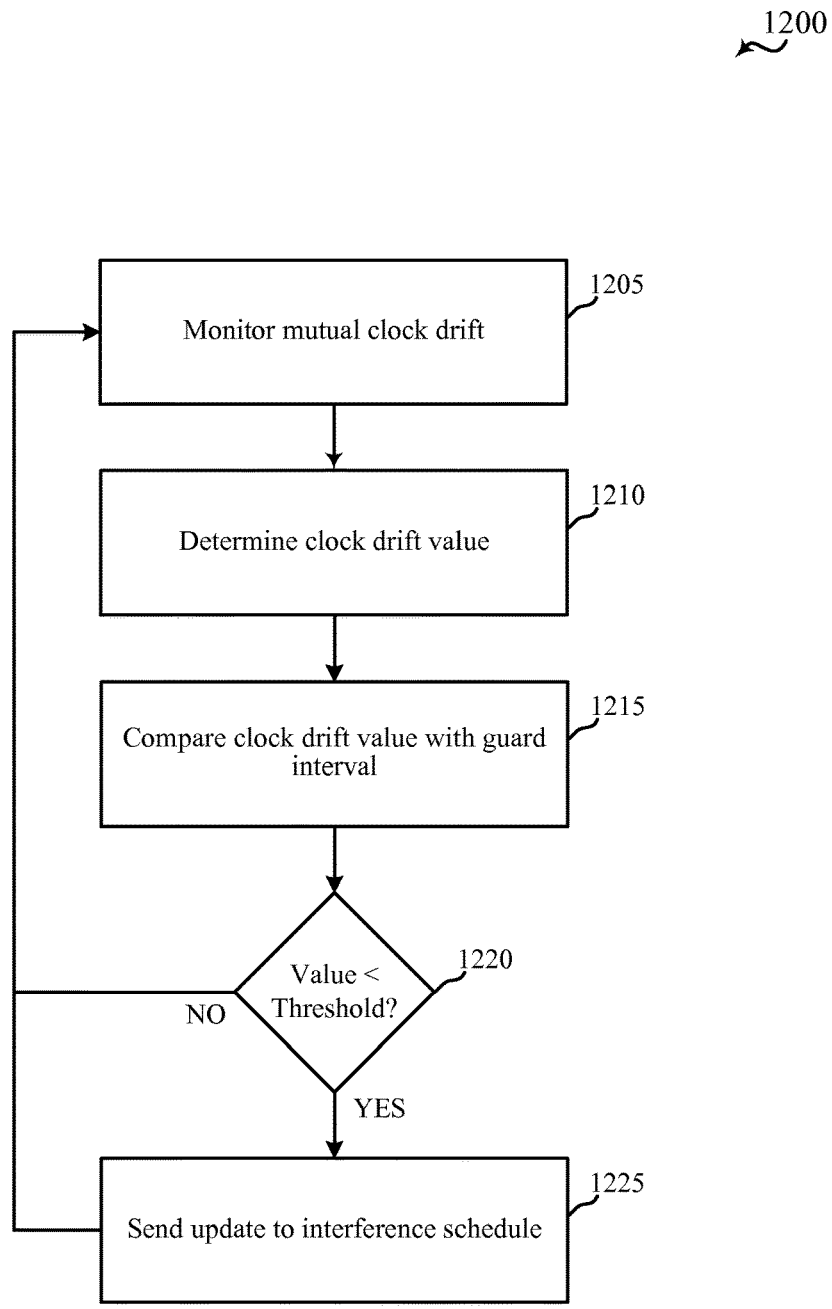
FIG. 12 is a flow chart illustrating a further example of a method for wireless communication, in accordance with various aspects of the present disclosure.

FIG. 12 is a flow chart illustrating an example of a method 1200 for wireless communication, in accordance with various aspects of the present disclosure. For clarity, the method 1200 is described below with reference to aspects of the STAs described with reference to FIGS. 1, 2A, 3 and 4, and/or aspects of the devices/apparatus described with reference to FIGS. 5A, 5B and 6. In some examples, a STA may execute various sets of codes to control the functional elements of the STA to perform the functions described below. Additionally or alternatively, the STA may perform various of the functions described below using-purpose hardware.

At block 1205, the STA may monitor mutual clock drift between the TSF clock of the AP and the local clock used for the different RAT (e.g., BT or LTE, etc.). Then, at block 1210, the STA may determine a clock drift value (e.g., time) based on the monitored mutual clock drift.

At block 1215, the clock drift value and the guard interval may be compared. As described above, for example, such comparison may be made by subtracting the clock drift value from the time of the guard interval to obtain a value that represents how close to the extent of the guard interval the clock drift has grown. A determination may be made at block 1220 as to whether the obtained value is less than a threshold. If not, the method may return to block 1205 to continue monitoring the mutual clock drift.

Otherwise, if the obtained value is less than the threshold, the method may continue to block 1225, where the STA may send an update to an interference schedule that indicates scheduled interference intervals for the different RAT being used by the STA.

The operations of the method 1200 may be performed using various components of the STA described with reference to FIGS. 5A, 5B, 6 and 7, for example. Thus, the method 1200 may provide for wireless communications between an AP and a STA having coexisting radios that use different RATs. It should be noted that the method 1200 is just one implementation and that the operations of the method 1200 may be rearranged or otherwise modified such that other implementations are possible.

In some examples, aspects from the various methods 800, 900, 1000, 1100 and 1200 may be combined. It should be noted that the methods 800, 900, 1000, 1100 and 1200 are just example implementations, and that the operations of the methods 800-1200 may be rearranged or otherwise modified such that other implementations are possible.

The detailed description set forth above in connection with the appended drawings describes examples and does not represent the only examples that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, flash memory, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

What is claimed is:

1. A method for wireless communication, comprising:
   determining a guard interval for a first wireless communication device (WCD) having coexisting radios that use a first radio access technology (RAT) and a second RAT, the second RAT being different from the first RAT;
   applying the determined guard interval before and after a scheduled interference interval of the first RAT for the first WCD, the guard interval defining a non-transmission time interval of the second RAT for the first WCD; and
   receiving a transmission via the second RAT from a second WCD at the first WCD based at least in part on the scheduled interference interval of the first RAT for the first WCD and the applied guard interval thereby avoiding the scheduled interference interval of the first RAT when an amount of clock drift exists between the first and second WCDs.

2. The method of claim 1, wherein the applied guard interval indicates to the first WCD not to send a trigger during the guard interval to the second WCD for a transmission from the second WCD.

3. The method of claim 1, wherein the applied guard interval indicates to the second WCD not to send a transmission to the first WCD in response to a trigger received from the first WCD during the guard interval.

4. The method of claim 1, wherein the second WCD comprises a wireless local area network (WLAN) access point (AP), further comprising receiving the guard interval via at least a beacon from the AP, or a probe response from the AP, or a combination thereof.

5. The method of claim 1, wherein determining the guard interval for the first WCD comprises receiving a default guard interval determined at a second WCD, the default guard interval capable of being overridden by a local guard interval determined at the first WCD.

6. The method of claim 1, wherein determining the guard interval for the first WCD is based at least in part on standards for clock drifts for the different RATs.

7. The method of claim 1, wherein determining the guard interval for the first WCD comprises determining a local guard interval specific to the first WCD.

8. The method of claim 7, wherein determining the local guard interval is based at least in part on a clock drift for a local clock of the first WCD.

9. The method of claim 7, further comprising overriding a default guard interval with the determined local guard interval.

10. The method of claim 1, wherein determining the guard interval for the first WCD comprises determining a common guard interval for a plurality of WCDs of a network that includes the first WCD.

11. The method of claim 10, wherein:
the second WCD comprises a wireless local area network (WLAN) access point (AP); and
determining the common guard interval comprises determining a guard interval common to WCDs of the WLAN AP including the first WCD.

12. The method of claim 1, further comprising:
monitoring mutual clock drift between the first WCD and the second WCD; and
sending a communication based at least in part on the mutual clock drift and the applied guard interval, the communication including an update to an interference schedule for the first WCD.

13. The method of claim 12, wherein the communication is sent from the first WCD to the second WCD.

14. The method of claim 12, further comprising:
determining a clock drift value based at least in part on the mutual clock drift; and
comparing the clock drift value to the applied guard interval, wherein sending the communication is performed when the clock drift value is within a threshold value of the applied guard interval.

15. An apparatus for wireless communication, comprising:
means for determining a guard interval for a first wireless communication device (WCD) having coexisting radios that use a first radio access technology (RAT) and a second RAT, the second RAT being different from the first RAT;
means for applying the determined guard interval before and after a scheduled interference interval of the first RAT for the first WCD, the guard interval defining a non-transmission time interval of the second RAT for the first WCD; and
means for receiving a transmission via the second RAT from a second WCD at the first WCD based at least in part on the scheduled interference interval of the first RAT for the first WCD and the applied guard interval thereby avoiding the scheduled interference interval of the first RAT when an amount of clock drift exists between the first and second WCDs.

16. The apparatus of claim 15, wherein the second WCD comprises a wireless local area network (WLAN) access point (AP), further comprising means for receiving the guard interval via at least a beacon from the AP, or a probe response from the AP, or a combination thereof.

17. The apparatus of claim 15, wherein the means for determining the guard interval for the first WCD comprises means for receiving a default guard interval determined at the second WCD, the default guard interval capable of being overridden by a local guard interval determined at the first WCD.

18. The apparatus of claim 15, wherein the means for determining the guard interval for the first WCD employs standards for clock drifts for the different RATs.

19. The apparatus of claim 15, wherein the means for determining the guard interval for the first WCD comprises means for determining a local guard interval specific to the first WCD.

20. The apparatus of claim 19, wherein the means for determining the local guard interval employs a clock drift for a local clock of the first WCD.

21. The apparatus of claim 19, further comprising means for overriding a default guard interval with the identified local guard interval.

22. The apparatus of claim 15, wherein the means for determining the guard interval for the first WCD comprises means for receiving a common guard interval determined for a plurality of WCDs of a network that includes the first WCD.

23. The apparatus of claim 22, wherein:
the second WCD comprises a wireless local area network (WLAN) access point (AP); and
the means for receiving the common guard interval comprises means for receiving a guard interval common to WCDs of the WLAN AP including the first WCD.

24. The apparatus of claim 15, further comprising:
means for monitoring mutual clock drift between the first WCD and the second WCD; and
means for sending a communication based at least in part on the mutual clock drift and the applied guard interval, the communication including an update to an interference schedule for the first WCD.

25. The apparatus of claim 24, wherein the means for sending is part of the first WCD and the communication is sent to the second WCD.

26. The apparatus of claim 24, further comprising:
means for determining a clock drift value based at least in part on the mutual clock drift; and
means for comparing the clock drift value to the applied guard interval, wherein the means for sending send the communication when the clock drift value is within a threshold value of the applied guard interval.

27. The apparatus of claim 15, wherein the applied guard interval indicates to the first WCD not to send a trigger during the guard interval to the second WCD for a transmission from the second WCD.

28. The apparatus of claim 15, wherein the applied guard interval indicates to the second WCD not to send a transmission to the first WCD in response to a trigger received from the first WCD during the guard interval.

29. An apparatus for wireless communication, comprising:
a guard interval determiner to determine a guard interval for a first wireless communication device (WCD) having coexisting radios that use a first radio access technology (RAT) and a second RAT, the second RAT being different from the first RAT; and
a transceiver to perform communications based at least in part on the determined guard interval, the determined guard interval located before and after a scheduled interference interval of the first RAT for the first WCD, the communications being via the second RAT and performed outside of the guard interval and the scheduled interference interval of the first RAT for the first WCD thereby avoiding the scheduled interference interval of the first RAT when an amount of clock drift exists between the first and second WCDs.

30. A non-transitory computer-readable medium storing computer-executable code for wireless communication, the code executable by a processor to:
   determine a guard interval for a first wireless communication device (WCD) having coexisting radios that use a first radio access technology (RAT) and a second RAT, the second RAT being different from the first RAT;
   apply the determined guard interval before and after a scheduled interference interval of the first RAT for the first WCD, the guard interval defining a non-transmission time interval of the second RAT for the first WCD; and
   receive a transmission via the second RAT from a second WCD at the first WCD based at least in part on the scheduled interference interval of the first RAT for the first WCD and the applied guard interval thereby avoiding the scheduled interference interval of the first RAT when an amount of clock drift exists between the first and second WCDs.

* * * * *